US011893696B2

(12) United States Patent
Lane et al.

(10) Patent No.: US 11,893,696 B2
(45) Date of Patent: Feb. 6, 2024

(54) METHODS, SYSTEMS, AND COMPUTER READABLE MEDIA FOR EXTENDED REALITY USER INTERFACE

(71) Applicant: The Trustees of the University of Pennsylvania, Philadelphia, PA (US)

(72) Inventors: Stephen H. Lane, Princeton, NJ (US); Matthew Anthony Boyd-Surka, Philadelphia, PA (US); Yaoyi Bai, Goleta, CA (US); Aline Sarah Normoyle, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 17/412,197

(22) Filed: Aug. 25, 2021

(65) Prior Publication Data

US 2022/0068029 A1 Mar. 3, 2022

Related U.S. Application Data

(60) Provisional application No. 63/070,674, filed on Aug. 26, 2020.

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *G06F 16/2379* (2019.01); *G06T 5/005* (2013.01); *G06T 15/60* (2013.01)

(58) Field of Classification Search
None
See application file for complete search history.

(56) References Cited

U.S. PATENT DOCUMENTS

| 9,734,634 B1 * | 8/2017 | Mott | G06F 3/002 |
| 10,551,993 B1 * | 2/2020 | Sanocki | G06F 3/017 |

(Continued)

*Primary Examiner* — Andrew G Yang
(74) *Attorney, Agent, or Firm* — Jenkins, Taylor & Hunt, P.A.

(57) ABSTRACT

Methods, systems, and computer readable media for providing an extended reality (XR) user interface. A method for providing an XR user interface occurs at a user device executing an XR application. The method comprises: receiving content information about a hierarchical container structure; obtaining, via the XR application, spatial information about a physical and/or virtual environment; generating, using the content information, at least one immersive visual element for visually representing the hierarchical container structure, wherein each of the at least one immersive visual element represents a container, a sub-container, or a data element of the hierarchical container structure; and providing, using the XR application, the spatial information, and a display, the at least one immersive visual element by augmenting a depiction of the physical and/or virtual environment so that a user can enter the at least one immersive visual element, access elements of the hierarchical container structure from within the at least one immersive visual element, and view the physical and/or virtual environment through the at least one immersive visual element.

20 Claims, 16 Drawing Sheets

(51) Int. Cl.
  *G06F 16/23* (2019.01)
  *G06T 15/60* (2006.01)
  *G06T 5/00* (2006.01)
  *G06T 15/00* (2011.01)

(56) References Cited

U.S. PATENT DOCUMENTS

| | | | |
|---|---|---|---|
| 10,990,240 B1* | 4/2021 | Ravasz | G06F 3/011 |
| 11,210,862 B1* | 12/2021 | Ciereszko | G06T 19/006 |
| 2015/0348329 A1* | 12/2015 | Carre | H04N 21/4782 |
| | | | 345/633 |
| 2017/0200316 A1* | 7/2017 | Giordano | G06F 1/163 |
| 2018/0074332 A1* | 3/2018 | Li | G06F 3/012 |
| 2018/0373412 A1* | 12/2018 | Reif | G06F 3/04815 |
| 2019/0362556 A1* | 11/2019 | Ben-Dor | G06T 19/006 |
| 2020/0249819 A1* | 8/2020 | Berquam | G06F 3/04815 |
| 2021/0034225 A1* | 2/2021 | Harazi | G06F 3/04847 |

* cited by examiner

METHODS, SYSTEMS, AND COMPUTER READABLE MEDIA FOR EXTENDED REALITY USER INTERFACE

PRIORITY CLAIM

This application claims the benefit of U.S. Provisional Patent Application Ser. No. 63/070,674, filed Aug. 26, 2020; the disclosure of which is incorporated herein by reference in its entirety.

TECHNICAL FIELD

This specification relates generally to extended reality (XR) (e.g., augmented reality (AR), virtual reality (VR), or mixed reality (MR)) and related user interfaces.

BACKGROUND

Today, many people are familiar with using directory trees to explore and/or view files and folders on a computer. This type of data structure has been very effective for displaying hierarchical data (e.g., a directory data structure) in various traditional two dimensional (2D) graphical user interfaces (GUIs). Although navigating directory trees works well in the flat, 2D environments of desktop PCs and mobile devices, it does not translate well into the 3D space of virtual reality (VR) and augmented reality (AR) worlds. It is possible to display files and folders in AR and VR in a 2D window but doing so does not take advantage of the immersive and spatial qualities of a full AR/VR user experience. When the physical world is augmented with computer generated content, the user may expect AR content to not only relate to, but also be capable of interacting with locations and physical objects in the real world.

SUMMARY

This specification describes methods, systems, and computer readable media for providing an extended reality (XR) (e.g., augmented reality (AR), virtual reality (VR), or mixed reality (MR)) user interface. In some embodiments, a method for providing an XR user interface occurs on a user device executing an XR application, where the method comprises: receiving content information associated with a hierarchical container structure; obtaining, via the XR application, spatial information (e.g., three dimensional (3D) spatial information) about a physical and/or virtual environment; generating, using the content information, at least one immersive visual element for visually representing the hierarchical container structure, wherein each of the at least one immersive visual element represents a container, a sub-container or a data element of the hierarchical container structure (e.g., an image, a video, a 3D graphical model, a sound, etc.); and providing, using the XR application, the spatial information, and a display, the at least one immersive visual element by augmenting a view of the physical and/or virtual environment so that a user can interact with the at least one immersive visual element, access elements of the hierarchical container structure from within the at least one immersive visual element, and view the physical and/or virtual environment through the at least one immersive visual element.

In some embodiments, a system for providing an XR user interface comprises one or more processors; and a user device executing an XR application using the one or more processors, where the user device is configured to perform operations comprising: receiving content information associated with a hierarchical container structure; obtaining, via the XR application, spatial information about a physical and/or virtual environment; generating, using the content information, at least one immersive visual element for visually representing the hierarchical container structure, wherein each of the at least one immersive visual element represents a container, a sub-container or a data element of the hierarchical container structure (e.g., an image, a video, a 3D graphical model, a sound, etc.); and providing, using the XR application, the spatial information, and a display, the at least one immersive visual element by augmenting a view of the physical and/or virtual environment so that a user can interact with the at least one immersive visual element, access elements of the hierarchical container structure from within the at least one immersive visual element, and view the physical and/or virtual environment through the at least one immersive visual element.

The subject matter described herein may be implemented in hardware, software, firmware, or any combination thereof. As such, the terms "function" or "node" as used herein refer to hardware, which may also include software and/or firmware components, for implementing the feature(s) being described.

The subject matter described herein may be applicable to mixed reality (MR), augmented reality (AR) or virtual reality (VR). As used herein, the terms "extended reality" or "XR" refer to one or more spatial computing technologies, e.g., AR, VR, and/or MR.

In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawing, wherein like reference numerals represent like parts, of which.

DETAILED DESCRIPTION

This specification describes methods, systems, and computer readable media for providing an extended reality (XR) (e.g., augmented reality (AR), virtual reality (VR), and mixed reality (MR)) user interface. In some embodiments, an example XR user interface according to various aspects disclosed herein can provide immersive, functional, and/or intuitive interactions, e.g., by representing hierarchically organized information as a set of nested geometric shapes, which may take the form of bubbles, which surround the user in the XR space. Just as a user can descend into deeper and deeper folders and subfolders in a typical file system, so too can they traverse the bubble hierarchy by entering bubbles and sub-bubbles (e.g., by tapping or walking in a physical world corresponding to the XR space). The experience is tied to the physical space around the user, giving them an immersive experience that is both intuitive and functional.

In some embodiments, an XR user interface in accordance with one or more aspects described herein can enable users to easily navigate, explore, and interact with content and other information (e.g., text, images, videos, 3D models) in a manner suitable for MR, VR, and/or AR worlds. In such embodiments, an AR user interface may use a bubble metaphor to bring the advantages of the familiar desktop file/folder directory representation to XR by allowing directory structures in XR to be visualized as a hierarchy of interactable nested bubbles.

In some embodiments, an XR user interface in accordance with one or more aspects described herein can have broad uses or applications including, but not limited to use in education and training, art and design, travel, information access and retrieval, assembly maintenance and repair, medicine, and healthcare. For example, an XR user interface in accordance with one or more aspects described herein may be used to display an art gallery or aspects thereof, with visual and information content organized into bubbles and sub-bubbles.

Figure 1:
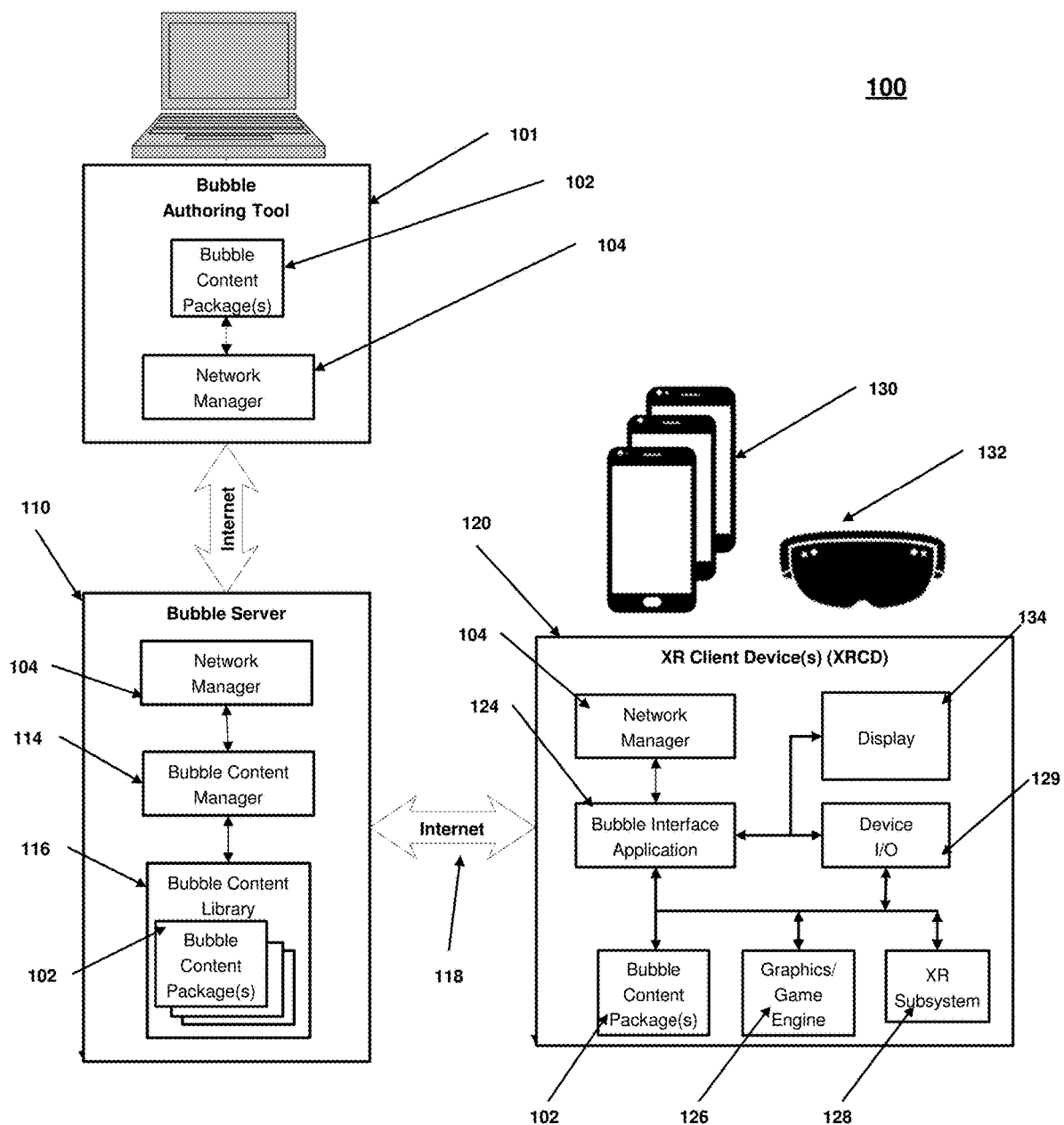
FIG. 1 shows example high-level architecture of a bubble interface system.

FIG. 1 shows an example high-level architecture of a bubble interface system (BIS) 100. In some embodiments, BIS 100 may include one or more devices, nodes, or platforms usable for providing an XR user interface in accordance one or more aspects described herein. For example, BIS 100 may include various nodes connected via internet 118 or other network for implementing an XR user interface, also referred to herein as an XR bubble interface, where sphere-like shapes or other immersive visual element(s) can visually represent a hierarchical container structure.

As depicted in FIG. 1, BIS 100 may include an XR Client Device(s) (XRCD) 120, a bubble server 110, and a bubble authoring tool (BAT) 101 connected via internet 118. BAT 101 may represent any suitable entity (e.g., a computer, mobile device, etc.) for generating, modifying, and/or deleting bubble content package(s) (BCP) 102 and may provide BCP 102 to bubble server 110. BAT 101 may include a network manager 104 (e.g., a communications module, a network interface card (NIC), and/or related logic) for communicating or interacting with bubble server 110 and/or other entities. For example, BAT 101 may utilize network manager 104 for sending and/or receiving data (e.g., BCP 102) via the Internet and/or another network (e.g., an Ethernet or WiFi network).

In some embodiments, e.g., where BIS 100 or a related bubble interface application 124 downloads content from the internet, a designer (e.g., a human, a program, a designer system) can create or modify BCP 102 by editing a human readable source file (e.g., in a JSON or xml format) or by interacting with a user interface (UI), a graphical UI (GUI), and/or an application programming interface (API). In some embodiments, BAT 101 may allow content designers to create various BCP 102 for providing different bubble interface AR user experiences.

In some embodiments, BAT 101 may allow designers to determine when BCP 102 should be activated on various XRCD 120 based on the physical location of the user (or XRCD 120) in the world (e.g., using global positioning system (GPS) coordinates) or by detection and/or recognizing triggering event information, e.g., a two dimensional (2D) image or a 3D object (e.g., a landmark or building). In some embodiments, BAT 101 may allow designers to publish their BCP 102 to bubble server 110 via a network manager 104 interface functions.

Bubble server 110 may represent any suitable entity (e.g., a computer, a blade server, a VM executing in a cloud computing environment, etc.) for receiving, storing, and/or providing BCP 102. Bubble server 110 may include a network manager 104 (e.g., a communications module, a network interface card (NIC), and/or related logic) for communicating or interacting with BAT 101, XRCD 120, and/or other entities.

In some embodiments, bubble server 110 may include a bubble content manager 114 for managing and/or maintaining a bubble content library 116. For example, bubble content library 116 may include multiple BCP 102 created and published by one or more content designers, where each BCP 102 may provide different bubble interface XR user experiences.

In some embodiments, bubble content manager 114 may be configured for communicating triggering event information (e.g., information for changing states or progressing in an XR user experience or related application) to XRCD 120, such as the user's location in the world and/or 2D images or 3D objects of interest that are intended to initiate bubble interface user experiences. After a triggering event has been detected on XRCD 120, bubble content manager 114 may access and provide or download BCP 102 to XRCD 120, e.g., based on a corresponding trigger event information key provided by XRCD 120. For example, trigger event information can be computed based on the location of the user in the world and/or the detection of an image or 3D object intended to trigger the user experience. In this example, network managers 104 on bubble server 110 and XRCD 120 may be utilized for accessing and retrieving BCP 102 from bubble server 110.

XRCD 120 may represent a user or client device (e.g., a mobile device, a smartphone 130 or a computer with a head-mounted display 132, such as a Microsoft Hololens). In addition to supporting either a touch screen or HMD display 134, XRCD 120 may include or have access to typical device I/O sensors and functions 129, including but not limited to one or more cameras, inertial sensors (e.g., accelerometers, gyros, magnetometers, etc.), GPS sensors, universal serial bus (USB) ports, cellular and wireless network communications interfaces, etc.

In some embodiments, XRCD 120 may include a computer vision-based XR subsystem 128 (e.g., implemented in either hardware and/or software) for tracking the position and orientation of XRCD 120 in the world based on detection of image targets or markers, by using advanced markerless methods such as simultaneous localization and mapping (SLAM), or other position/orientation sensing technologies including but not limited to radio frequency (RF), ultrasound, etc.

In some embodiments, XRCD 120 may include a graphics and/or game engine (graphics/game engine) 126. For example, graphics/game engine 126, such as Unity 3D or Unreal Engine, may be a subsystem component. In some embodiments, graphics/game engine 126 may be capable of animating and rendering both 2D and 3D graphics, accessing device I/O sensor data and displaying the rendered images on the display 134.

Bubble interface application 124 may represent an XR application executing at or on XRCD 120. For example, bubble interface application 124 may provide and/or implement an XR user interface (e.g., a bubble interface). In this example, bubble interface application 124 may load or present an XR user experience associated with downloaded BCP 102, e.g., via appropriate calls to functions in graphics/game engine 126, XR subsystem 128, and network manager 104.

It will be appreciated that FIG. 1 is for illustrative purposes and that various nodes, their locations, and/or their functions may be changed, altered, added, or removed. For example, some nodes and/or functions may be combined into a single entity. In a second example, a node and/or function or related computation(s) may be located at or implemented by two or more nodes and/or distributed across a local network or the internet.

Figure 2:
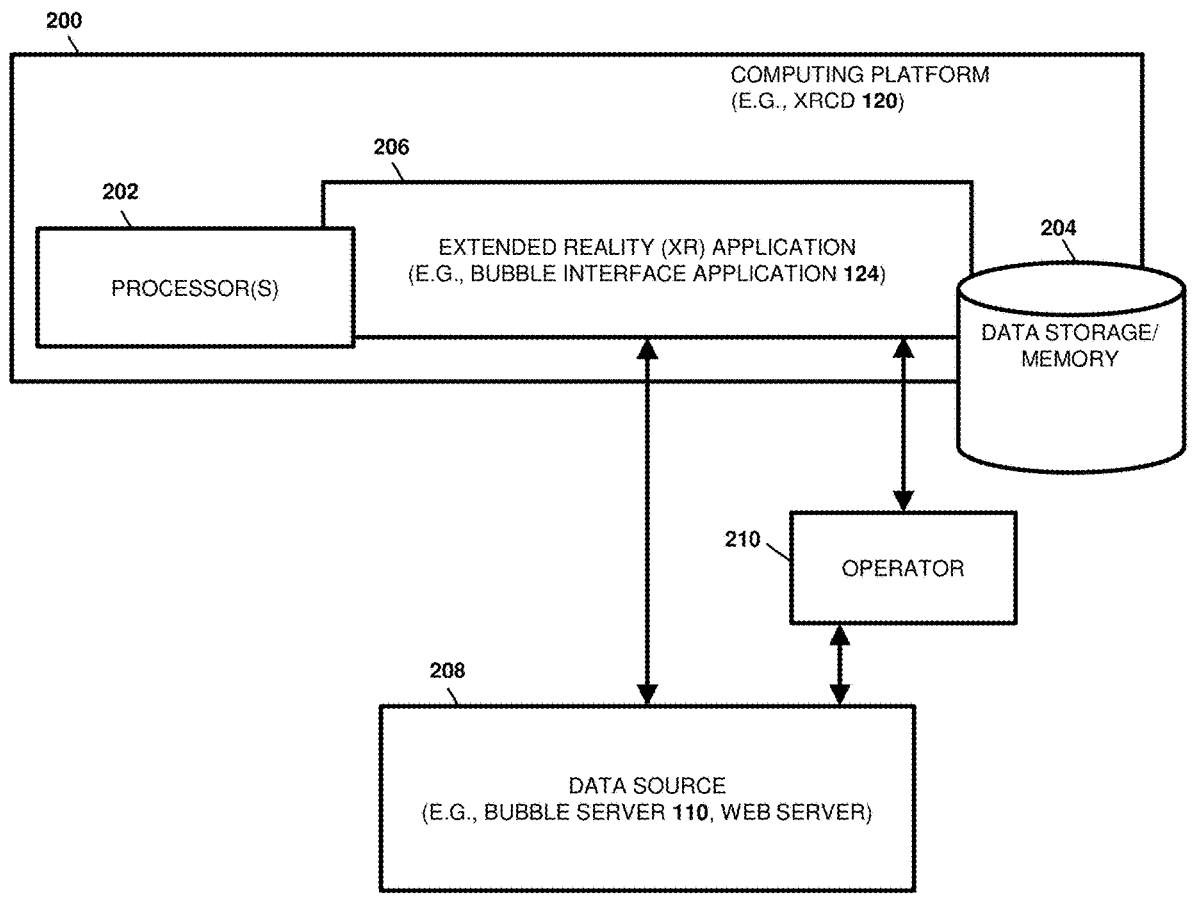
FIG. 2 is a diagram illustrating an example computer platform usable for implementing or providing an extended reality (XR) user interface.

FIG. 2 is a diagram illustrating an example computing platform 200 (e.g., an XR capable computer, a smartphone, an XR headset, etc.) usable for implementing or providing an XR user interface, e.g., an XR bubble interface. Computing platform 200 may be any suitable entity, such as a computing device, node, or platform, for performing one or more aspects of the present subject matter described herein. In some embodiments, components, modules, and/or portions of computing platform 200 may be implemented or distributed across multiple devices or computing platforms.

In some embodiments, computing platform 200 may represent or include XRCD 120 or a similar device. For example, computing platform 200 may be a user device (e.g., a smart phone, a mobile device, a laptop, a computer with a head mounted display such as the Microsoft Hololens, or one or more other computing platforms, etc.) for performing various aspects associated with providing and/or using an XR user interface. In such embodiments, computing platform 200 may include a camera, a display, and hardware and software for running various applications, e.g., an XR application 206.

Computing platform 200 may include various components and/or control modules, e.g., one or more communications interface(s), a display or screen, one or more processor(s) 202, data storage and/or memory 204, and an XR application 206 (e.g., bubble interface application 124). In some embodiments, communications interface(s) may be any suitable entity or entities (e.g., a communications card or controller) for receiving and/or sending communications.

For example, a communications interface may include a UI, a GUI, or an API for allowing an XR application 206 to interact with data source 208 when downloading content for XR visualization. In another example, a communications interface may be associated with a user interface, operator 210, or other entity (e.g., a configuration tool or device) and may be usable for receiving configuration settings and/or other information associated with XR related user interaction. In yet another example, one or more communications interfaces (e.g., an application programming interface) may be used to interact with a camera and/or to obtain spatial information or other information related to a physical and/or virtual environment via an AR framework or software development kit (SDK), e.g., Google ARCore, Apple ARKit, or Microsoft Mixed Reality Toolkit (MRTK). In yet another example, one or more communications interfaces may be used to provide a display with XR content (e.g., immersive visual elements representing a hierarchal container structure) and/or to provide instructions for overlaying a visual depiction of a real-world or physical environment with XR content.

Processor(s) 202 represents any suitable entity or entities (e.g., a physical processor, a field-programmable gateway array (FPGA), and/or an application-specific integrated circuit (ASIC)) for performing one or more functions associated with XR visualization, user interaction, or related processing. Processor(s) 202 may be associated with XR application 206. For example, XR application 206 or a related user interface, e.g., software or algorithms therein, may be implemented using (e.g., executed by) processor(s) 202 and/or memory 204.

Memory 204 may be any suitable entity (e.g., random access memory or flash memory) for storing software, logic, and/or information associated with an XR user interface and related processing. For example, memory 204 may store software (e.g., XR application 206 or a related user interface) and/or logic associated with one or more algorithms associated with various aspects or functionality described herein.

In some embodiments, components, such as communications interface(s), XR application 206, and software executing on processor(s) 202, of computing platform 200 may utilize (e.g., read from and/or write to) memory 204. For example, memory 204 may be usable to store multiple data files (e.g., JavaScript object notation (JSON) files, extensible markup language (XML) files., and/or other data interchange formatted files) representing hierarchical container structures and may be indexed by a key or identifier. In another example, memory 204 may be usable to store various user settings, spatial information associated with a physical or real-world environment, and/or other information related to XR application 206. An example of a JSON data file for representing a hierarchical bubble container structure is shown in Appendix A.

Data source 208 may represent any suitable entity (e.g., a web server, bubble server 110, a computer readable medium, a database, a storage device, or memory) for storing content for representing visual hierarchical container structures and/or other data. For example, content may be stored as and/or provided as JSON data files or XML data files. In this example, a data file may represent various nodes or elements of a container structure, where the node or element may include visual settings indicating how the node or element will appear on a display or screen (e.g., size, shape, icon or image, etc.) and associated data or one or more hyperlinks (e.g., uniform resource identifiers (URIs)) to data that is associated with the node or element.

Operator 210 may be any entity (e.g., an automated system or a device or system controlled or controllable by a human user) for selecting, viewing, and/or configuring various aspects associated with XR application 206 or data source 208. For example, operator 210 may provide configuration information to XR application 206. In another example, operator 210 may modify a JSON data file stored on data source 208 via one or more communications interfaces. Example user interfaces for interacting with XR application 206 or data source 208 may support automation (e.g., via one or more scripting languages), a representation state transfer (REST) API, a command line, and/or a web based GUI and may support or utilize one or more network protocols.

XR application 206 may be any suitable entity or entities (e.g., software executing on at least one processor) for performing XR related services and/or providing an XR user interface. For example, XR application may include the same or similar functionality as described herein regarding bubble interface application 124.

In some embodiments, XR application 206 may be configured to use one or more techniques, methods, and/or algorithms for displaying immersive visual elements that represents a container and/or files or sub-containers therein. For example, XR application 206 may augment a video or live view of a current physical or real-world environment with immersive visual elements representing a container structure. In this example, the immersive visual elements may include geometric shapes such as spheres (e.g., bubbles), cubes, pyramids, circles, squares, and/or other container shapes and may also include pictures, images, audio, videos, words, or other items within the bubbles or containers and the immersive visual elements may appear as part of a live or substantially live depiction of a real-world environment showing on a screen of computing platform 200. Continuing with this example, a user may interact with the immersive visual elements by interacting via the screen (e.g., by tapping a bubble or item therein), by moving the position of their fingers, hands, and/or other body part to the 3D spatial location of the immersive element or by a user moving into the bubble (e.g., via the user walking in the real-world environment to where the immersive visual element appears to be located).

In some embodiments, XR application 206 may provide an XR user interface (e.g., a bubble interface) that utilizes multiple visual elements and/or other features for supporting a responsive and intuitive user. Example visual elements and/or other features may include shadows, popup visuals, sound effects, user cues, and/or transitions.

In some embodiments, shadows in an XR space may be usable for providing visual cues to the scale and positions of objects. Shadows can be highly effective as such cues since they can further the illusion that virtual objects are in a corresponding physical space. Further, shadows can be used for obtaining a user's attention or focus. For example, XR application 206 may depict bubbles that are at the appropriate size for observation as casting strong shadows, while depicting a parent bubble as casting a weak shadow. In this example, when a user enters or exits a bubble, XR application 206 may cross-fade relevant shadows during a transition sequence.

In some embodiments, popup visuals in an XR space may be usable for redirecting or keeping a user looking at a relevant physical and/or virtual space, rather than at content represented in 2D. For example, instructional messages can be anchored to 3D objects using a popup visual or related system. In some embodiments, popups can help to keep instructions concise, since they can point to the objects they reference.

In some embodiments, sound effects in XR application 206 may be usable for acknowledging user feedback and other aspects associated with user experience. For example, XR application 206 may use sound effects to acknowledge user input (e.g., a 'bubble enter' sound or a 'bubble exit' sound and punctuate important events (e.g., a 'portal selection' sound or a 'target image detected' sound).

In some embodiments, visual cues in an XR space may be usable for effectively communicating to users that they should observe the space surrounding them while using the app. For example, to prevent an XR user from scanning a poster and then turning away from it or to prevent confusion when child bubbles are not immediately seen when entering a bubble, visual cues can be used to direct the user focus and/or to suggest or indicate a next action for progressing in an XR user experience.

Example visual cues for various issues and/or situations associated with an XR user experience or XR application 206 may include animations that hint to the user that objects may be to the side or behind them, smooth and/or timely transitions between foam levels to prevent the user from becoming disoriented, carefully worded popups to tell the user where to look next. In some embodiments, one or more visual cues may be dynamic or shown in response to a lull or a detected period of inactivity. For example, if XR application 206 detects that a user is not looking at anything of interest and also is not changing the position and/or orientation of their XRCD 120 in the physical world, XR application 206 will wait a predetermined amount of time (e.g., a few seconds) and then display a short message prompting the user to look around.

In some embodiments, visual transitions in an XR space may be usable for helping a user stay oriented in the bubble hierarchical structure or their related position therein. For example, XR application 206 may keep the transitions between levels of a relevant foam (e.g., collection of bubbles) continuous (e.g., smooth and/or timely) in an effort to prevent users from becoming disoriented and to help them perceive the bubbles as a nested hierarchy.

Example techniques for representing a hierarchal container structure (e.g., a hierarchy of bubbles or foam) may include constructing a foam at runtime with no hard-coded hierarchy elements; supporting an arbitrary number of hierarchy levels and irregular trees; making it clear that the user "enters" a bubble when they tap it (e.g., by depicting a selected bubble growing such that its children are scaled up to surround the user); limiting the number of bubbles displayed on screen at one time so as not to overwhelm the user; and/or allowing the user to traverse a foam (e.g., a hierarchy) in both directions (e.g., up and down or in and out).

In some embodiments, by utilizing smooth and/or timely transitions between different levels of an XR based hierarchical container structure (e.g., a bubble hierarchy), XR application 206 can allow an XR user to interact with an XR space (e.g., based on a real-world environment) and the related hierarchical container structure in an interactive and intuitive manner. However, in some embodiments, the processing for providing this XR experience may be somewhat more complex, because the foam may need to move as a unit to preserve the illusion of nested bubbles. For example, in addition to computing the correct position, orientation, and scale of a depicted foam, colliders may be switched on and off, bubbles and their shadows and content may be crossfaded, spinning animations may be started and stopped, and these various aspects may need to occur over fixed periods of time using spline-based (e.g., linear, cubic, etc.) interpolation.

In some embodiments, XR application 206 may provide various features for extending and/or improving XR user experiences associated with hierarchical container structures. For example, XR application 206 may provide a bubble interface that facilitates chained or connected XR user experiences. For example, XR application 206 or related interface may be configured to make greater use of the physical world by leading the user from the location of one trigger event (e.g., target image or 3D object) to another location, thereby chaining together multiple experiences instead of leaving each one as a discrete experience.

In some embodiments, XR application 206 or a related content system may allow for greater control of XR user experiences. For example, by using human readable file formats (e.g., a JSON source file) for BCP 102, an author may specify the structure of a content hierarchy, the images and text that are displayed, and the webpages to which leaf bubbles point. In this example, with various modifications, a BCP source file can let the author specify additional settings or features as well, e.g., bubble size, popup text and images, sound effects or other audio, etc.

In some embodiments, XR application 206 or a related interface may provide various interaction options. For example, in addition to using XR application 206 or a related system for presenting art-based experiences in a portable and accessible way, XR application 206 or a related system can enable users to extend and personalize various AR-based experience, e.g., by crowd-sourcing additional details, ratings, or recommendation.

In some embodiments, a user of XR application 206 or a related interface may be an observer, e.g., viewing a particular content package without adding to or modifying it. In some embodiments, a user of XR application 206 or a related interface may also add to and/or modify the XR user experience, e.g., if the user is granted permission by a relevant authority like the BCP author. For example, XR application 206 or a related bubble interface may allow users to add stickers, graffiti, comments, and feedback to each bubble, may allow users to pin feedback or user-created elements in 3D space, may allow users to enable and/or pin "word clouds" over the main bubble that summarize the most frequently occurring words used in user comments and feedback, may allow users to pin to create new sub bubbles, and/or may allow users to generate new bubble experiences with links to their own content, e.g., using in-app commands or a separate web-based, BAT user interface.

It will be appreciated that FIG. 2 is for illustrative purposes and that various nodes, their locations, and/or their functions may be changed, altered, added, or removed. For example, some nodes and/or functions may be combined into a single entity. In a second example, a node and/or function may be located at or implemented by two or more nodes. Further, it will be appreciated that computing platform 200 may include or interact with various components (e.g., touchscreens, head-mounted displays, cameras, gyroscopes, sensors, etc.) and/or functions not shown in FIG. 2 or described herein.

Figure 3:
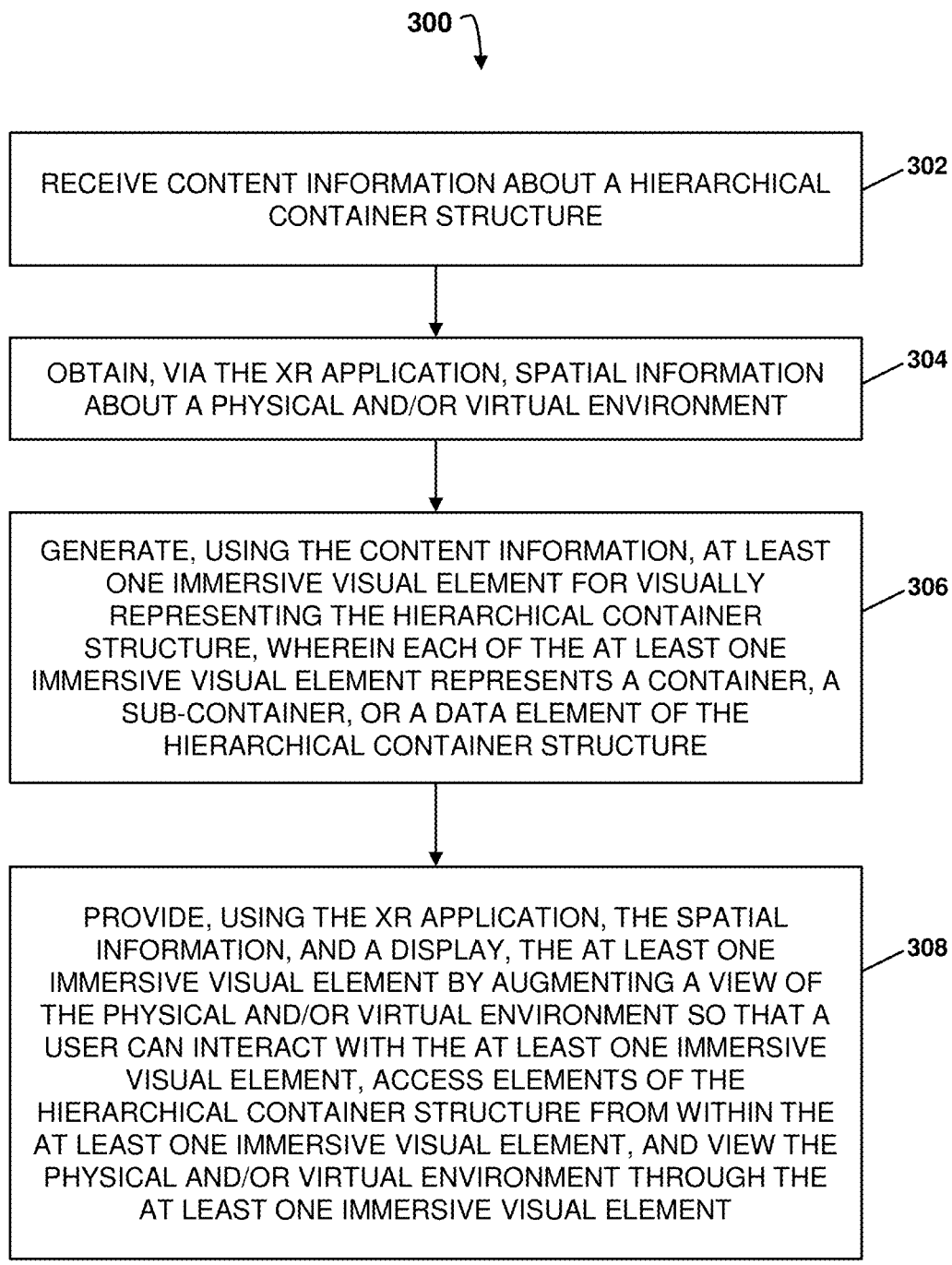
FIG. 3 is a flowchart illustrating an example process for providing an XR user interface.

FIG. 3 is a diagram illustrating an example process 300 for providing an XR user interface (e.g., an XR bubble interface). In some embodiments, example process 300 may include an algorithm or related logic for providing an XR user interface and/or for processing related interactions therewith. In some embodiments, exemplary process 300, or portions thereof, may be performed by or at computing platform 200, XR application 206, XRCD 120 (e.g., a user device, an XR capable computer, a smartphone, or an XR headset), and/or another node or module.

Referring to process 300, in step 302, content information may be received about a hierarchical container structure. In some embodiments, content information may be provided using an XML format, a data interchange format, or a JSON format.

In some embodiments, content information may be provided in response to detecting or scanning an image or an object, by utilizing a uniform resource identifier (URI) or a uniform resource locator (URL), or by clicking or selecting a hyperlink or interactive object via a user interface.

In some embodiments, content information may be stored and indexed using a unique identifier for subsequent usage by the user device.

In step 304, spatial information about a physical and/or virtual environment may be obtained via an XR application. For example, XR application 206 or bubble interface application 124 may utilize an XR subsystem (e.g., ARCore, ARKit, MRTK) and a camera to obtain spatial information about an indoor or outdoor real-world environment associated with the user, e.g., an office, rooms in a home, library, or museum or the exterior of a building, statue in a park, historic site, etc. In another example, XR application 206 or another entity (e.g., a VR game or world provider) may provide spatial information about a virtual environment, e.g., a 3D virtual world associated with a game or game system.

In some embodiments, spatial information may include a location of a ground plane in a physical and/or virtual environment, a location of a vertical surface in a physical and/or virtual environment, or a location of a horizontal surface in a physical and/or virtual environment. In some embodiments, obtaining spatial information may involve an orientation process, e.g., requiring a user to move around XRCD 120 (e.g., smart phone or Hololens) to show different portion of a physical and/or virtual environment and/or to click immersive visual elements or prompt elements.

In step 306, at least one immersive visual element for visually representing the hierarchical container structure may be generated using the content information, wherein each of the at least one immersive visual element represents a data file, a container, a sub-container, or a data element of the container structure.

In some embodiments, an immersive visual element may be a semi-translucent bubble or a container element representing a container (e.g., a folder). In such embodiments, the semi-translucent bubble or container element may include additional immersive visual elements (e.g., pictures or icons) representing files and/or sub-containers. For example, XR application 206 may depict on a display of a user device a number of virtual semi-translucent bubbles overlaid on a depiction of a video of the real-world environment. In this example, each virtual bubble may represent a different folder or container associated with a hierarchal container structure as described or defined in a related content file, a JSON file. Continuing with this example, each virtual bubble may include additional elements, e.g., pictures, text, video, audio, etc.) representing data in the container or other bubbles representing sub-containers.

In step 308, the at least one immersive visual element may be provided using the XR application, the spatial information, and a display, wherein the at least one immersive visual element augments a depiction of the physical and/or virtual environment so that a user can enter the at least one immersive visual element, access elements of the hierarchical container structure from within the at least one immersive visual element, and view the physical and/or virtual environment through the at least one immersive visual element. For example, XR application 206 may depict on a display of a user device virtual semi-translucent bubbles overlaid on a live view or a video depiction of the real-world environment. In this example, the bubbles may appear to cast a shadow and/or appear to exist in the real-world as depicted on the display of the user device. Continuing with this example, the bubbles may appear at a user's eye level or otherwise near (e.g., bubbles may surround the user) based on spatial information obtained at least in part by the XR subsystem and related logic.

In some embodiments, providing at least one immersive visual element may include allowing a user to interact with a first container element of the at least one immersive visual element by selecting or tapping (e.g., with their hand or finger(s)) the first container element using the display, by selecting or tapping outside the first container element using the display, by selecting or tapping a contained element within the first container element using the display, by moving their fingers, hand, other body part of body into (e.g., colliding with) or toward a physical location in the physical and/or virtual environment representing the first container or container element, or by moving away from the physical location in the physical and/or virtual environment representing the first container or container element.

In some embodiments, providing at least one immersive visual element may include providing one or more visual cues for enhancing user experience or user interaction. In such embodiments, an example visual cue may include providing a shadow for the at least one immersive visual element, providing shading for the at least one immersive visual element, providing descriptive text or user prompts associated with the at least one immersive visual element, or providing a visual transition for indicating a user interaction event or for different actions associated with the at least one immersive visual element.

In some embodiments, providing at least one immersive visual element may include providing an authoring tool (e.g., BAT 101) for allowing a user to change or add information, immersive visual elements, or preferences to the immersive visual element or a related data file, wherein the changes may be stored and accessible by one or more users.

It will be appreciated that process 300 is for illustrative purposes and that different and/or additional actions may be used. It will also be appreciated that various actions described herein may occur in a different order or sequence.

Figure 4:
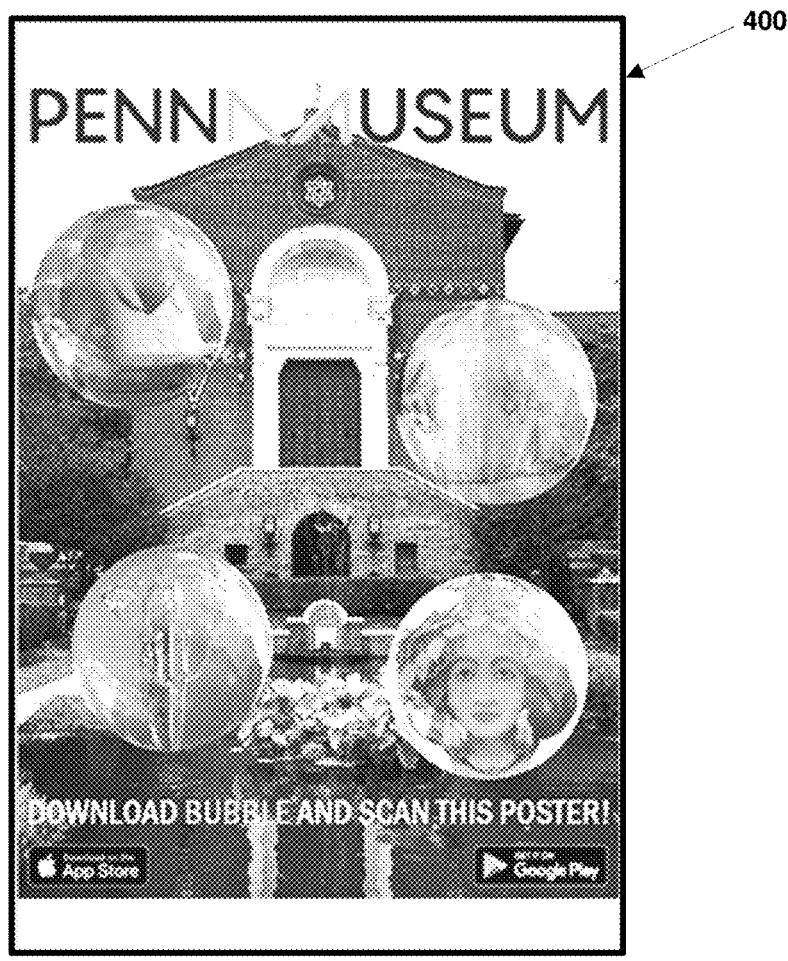
FIG. 4 shows an example target image for triggering an XR bubble experience.

FIG. 4 shows an example target image 400 (e.g., a museum poster) for triggering an XR bubble experience. In some embodiments, an XR experience may be provided via XR application 206 (e.g., bubble interface application 124). In such embodiments, XR application 206 or a related interface may be implemented using an Android smartphone using the Unity game engine with Google ARCore as XR subsystem 128. For example, when XR application 206 is launched, after detecting a target image 400 (e.g., a poster) shown in FIG. 4, XR application 206 may download an associated BCP 102 (e.g., a JSON file) which may be hosted online (e.g., by data source 208 like bubble server 110). In this example, using the downloaded BCP source file, XR application 206 may procedurally construct a hierarchy of bubbles (also referred to herein as a "foam") using the node metadata and asset information (image, sound video URLs) contained in downloaded BCP source file.

In some embodiments, BCP 102 or a related source file may include or represent a plurality of nodes (e.g., representing containers, bubbles, etc.). In some embodiments, each node in a BCP source file may be include various data elements, e.g., a "Description" element for indicating text that appears above the bubble; an "ImageURL" element for indicating one or more URLs of the image(s) to display in the visual representation of the node; a "LinkURL" element for indicating one or more URLs to open when the visual representation of the node is tapped or interacted with; a "SerializableTexture" element for indicating various characteristics (e.g., width, height, bytes, etc.) of the visual representation of the node, and/or a "Children" element.

In some embodiments, a "Children" data element may be an array or other data structure for storing child nodes and may be used in the construction of a related "Foam". Appendix A contains an example of a BCP source file, which is hereby incorporated by reference in its entirety.

In some embodiments, every BCP 102 or related source file has a single root node, and every node may have an arbitrary number of children. In such embodiments, after a BCP source file is read by XR application 206 or related entities, a resulting bubble hierarchy generated may reflect the hierarchical node structure in the BCP source file and XR application 206 or a related interface may position and scale related bubbles accordingly. For example, FIG. 5 depicts how a foam would look if each non-leaf bubble had four children node.

Figure 5:
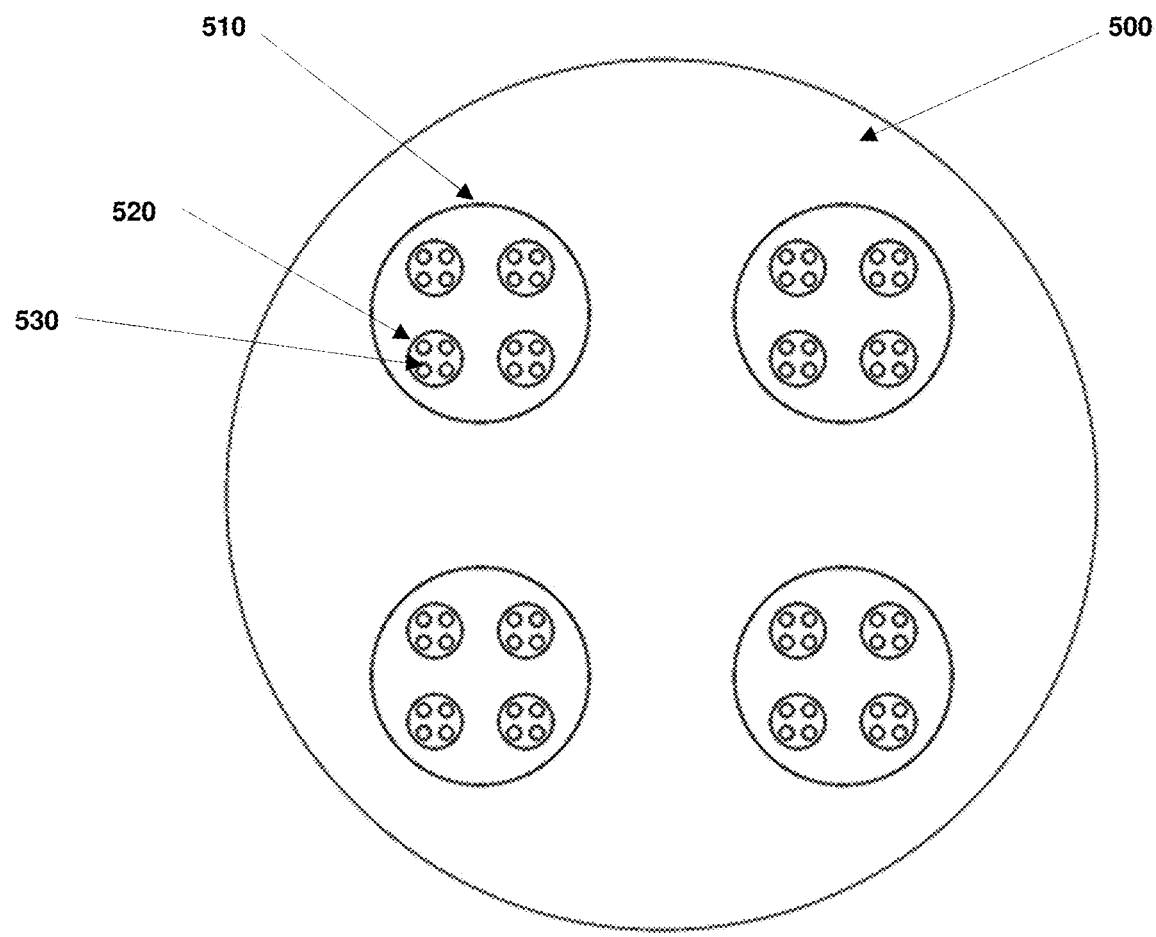
FIG. 5 is a diagram illustrating an example bubble hierarchy.

FIG. 5 is a diagram illustrating an example bubble hierarchy or foam 500. While foam 500 is depicted as symmetrical with same or even number children nodes 510 and sub-children nodes 520, foam 500 can have various number of bubbles and each bubble may have different numbers of children nodes. Further, it will be appreciated that the size and spacing of bubbles in foam 500 can be procedurally or dynamically adjusted, e.g., based on the number of children, the importance of a bubble, or the size of the visual content (e.g., image, video, 3D graphical models, etc.) it contains.

In some embodiments, after a BCP 102 or related source file is downloaded, BCP 102 or the related source file may be saved locally and identified with a unique key for future retrieval or use (e.g., so that each BCP 102 only needs to be downloaded once from a server). In some embodiments, while foam 500 is being prepared and computed in the background, XR application 206 or a related interface may prompt a user to look around with their XRCD 120 in a brief interactive sequence or initialization process so that XR subsystem 128 or another entity (e.g., XR application 206) can scan the physical environment for various environmental features (e.g., objects, horizontal and vertical surfaces, etc.) or scene boundaries (e.g., walls, floors, ceilings, doorways, etc.). In such embodiments, after the scanning of the physical environment is complete, foam 500 may appear in the XR space and the user may begin interacting with it.

Figure 6:
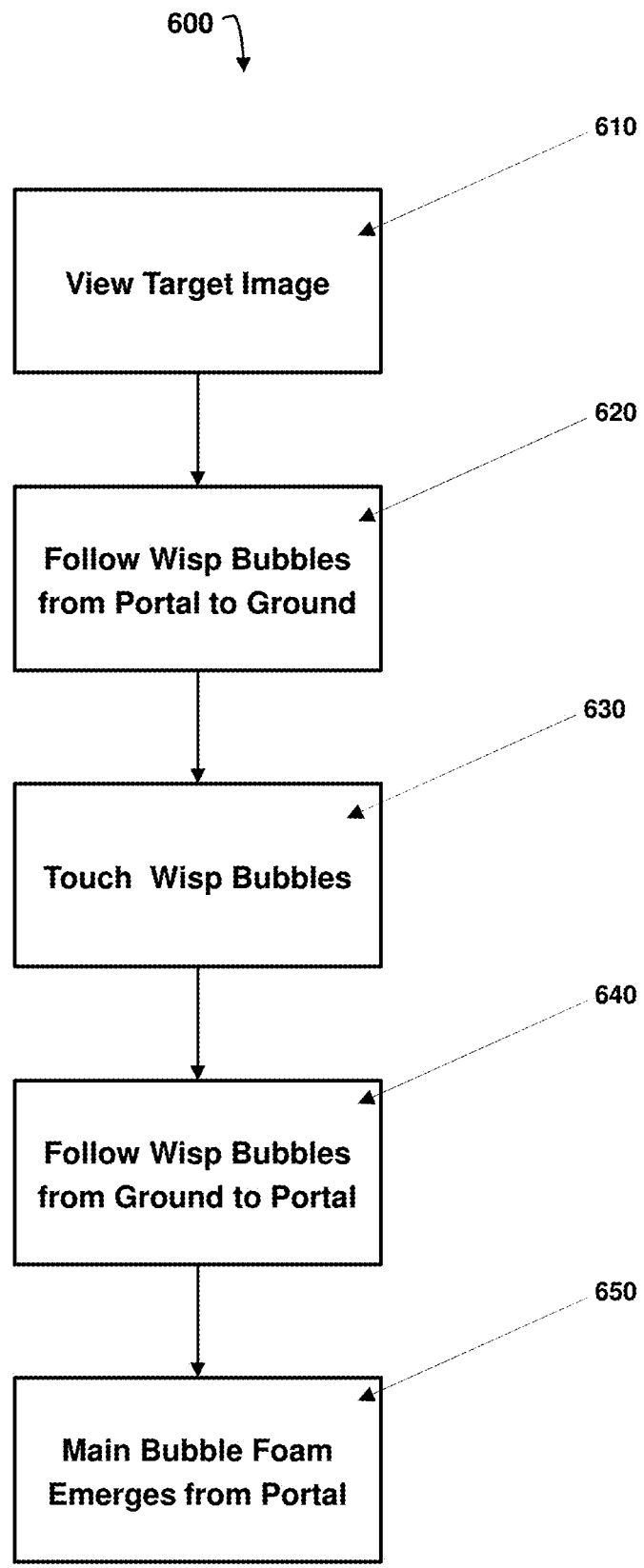
FIG. 6 illustrates an example initialization process for displaying interactive elements appropriately in an XR space.

FIG. 6 illustrates an example initialization process 600 for displaying interactive elements appropriately in an XR space. FIGS. 7A-7D depict screenshots indicating aspects of initialization process 600. In some embodiments, XR application 206 or a related interface to correctly position elements (and shadows) in the XR space, XR application 206 or a related interface may utilize initialization process 600 for scanning a physical environment to determine the location of horizontal surfaces (e.g., a ground plane) and vertical surfaces (e.g., walls). In such embodiments, e.g., to keep a user engaged during initialization process 600, XR application 206 or a related interface may facilitate and/or present initialization process 600 as a short user task, e.g., steps shown in FIG. 6.

Figure 7A:
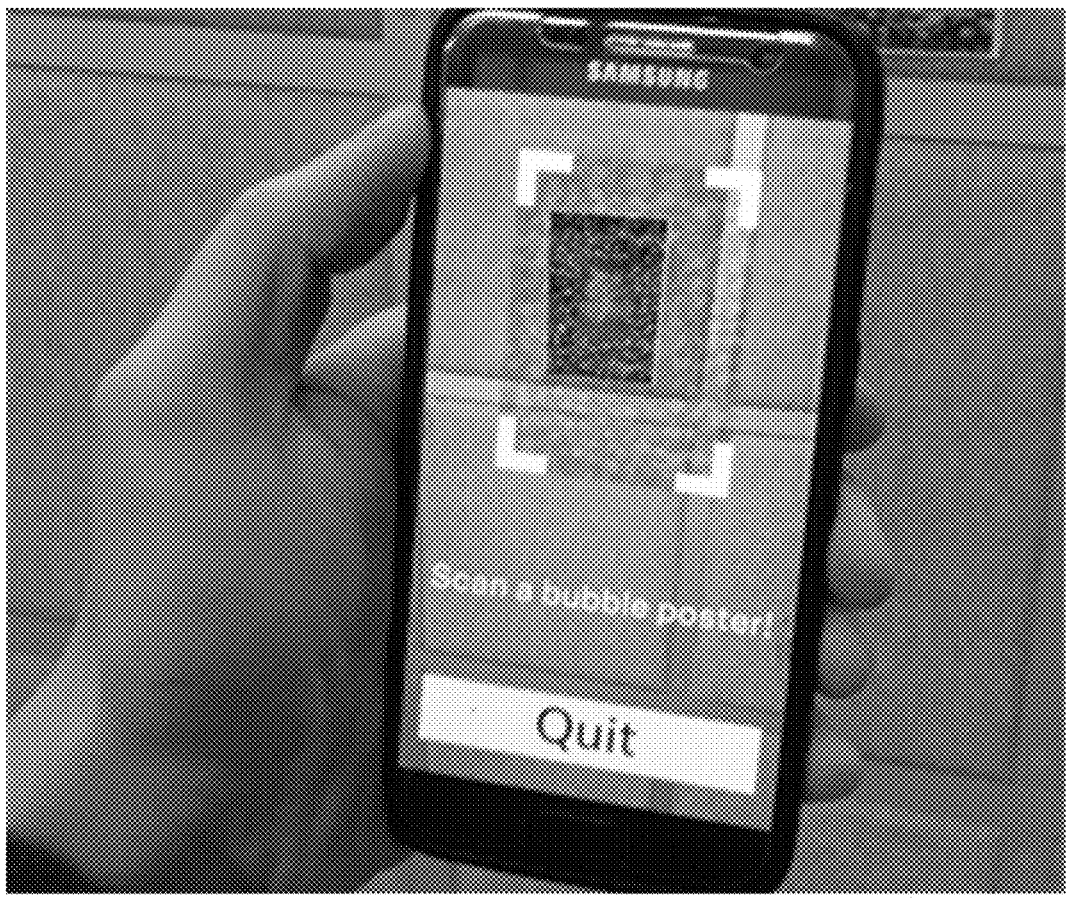
FIGS. 7A-7D depict screenshots indicating aspects of the example initialization process.

Referring to FIG. 6, in step 610, as shown in FIG. 7A, a user may be asked to scan a special image (also referred to herein as a target image) associated with a particular BCP 102 located in a physical space, such as the poster shown in FIG. 4. In some embodiments, scanning a target image may be similar to scanning a QR code. In some embodiments, a target image may be usable for notifying a user that XR based interface content (e.g., XR bubble interface content) is available, and for allowing them to easily activate the associated user experience. In some embodiments, the target image can provide an initial anchor that XR application 206 or a related interface uses to place content elements in the physical world before the user has scanned their environment.

Figure 7B:
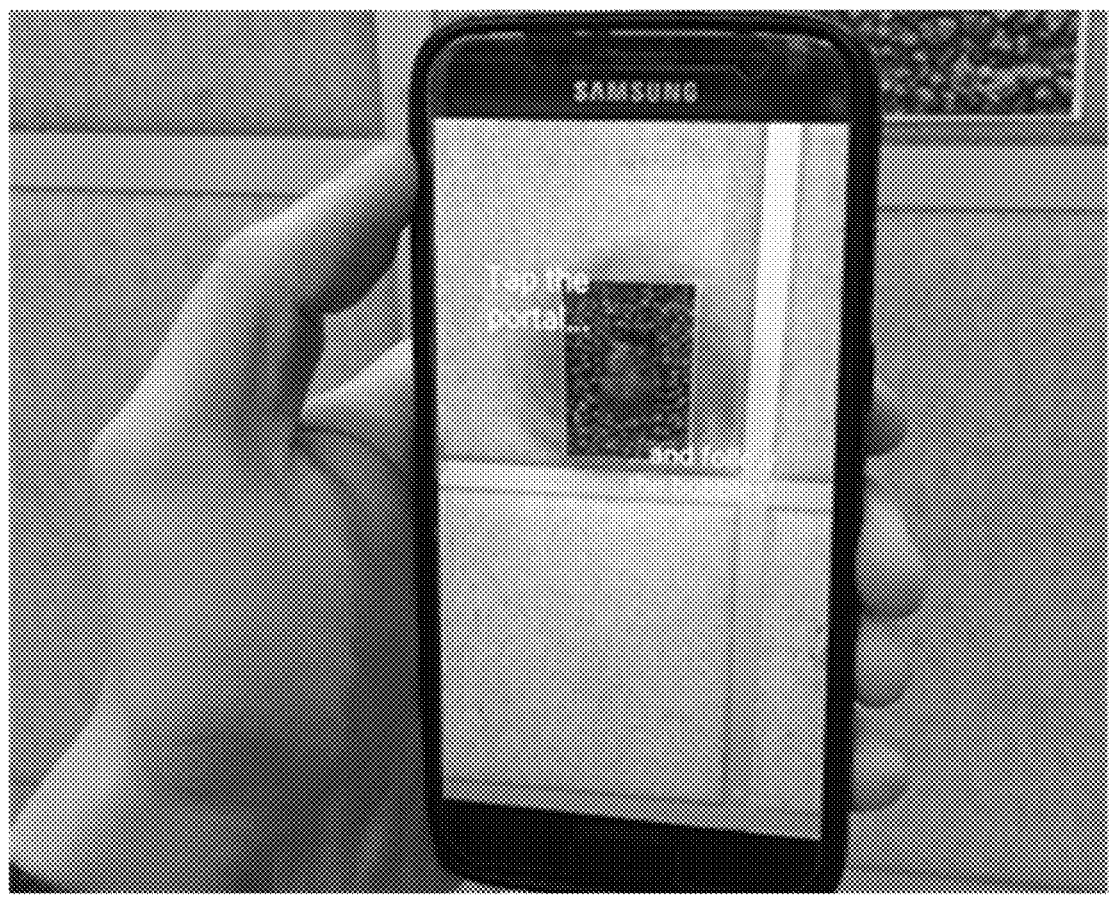

In step 620, as shown in FIG. 7B, after the target image has been recognized, a portal appears. The user may be instructed to tap on the portal and follow the small set of bubbles (hereafter referred to as "wisps") that emerge.

Figure 7C:

In step 630, as shown in FIG. 7C, the user may look around, tapping each of the wisps that hover near the floor. Concurrently with user tapping, XR application 206 or a related interface may gather information about the surrounding physical space, which it uses to position the wisps' virtual shadows on the physical floor.

In step 640, after all the wisps have been tapped by the user, wisps may be animated such that the wisps return to the portal.

Figure 7D:
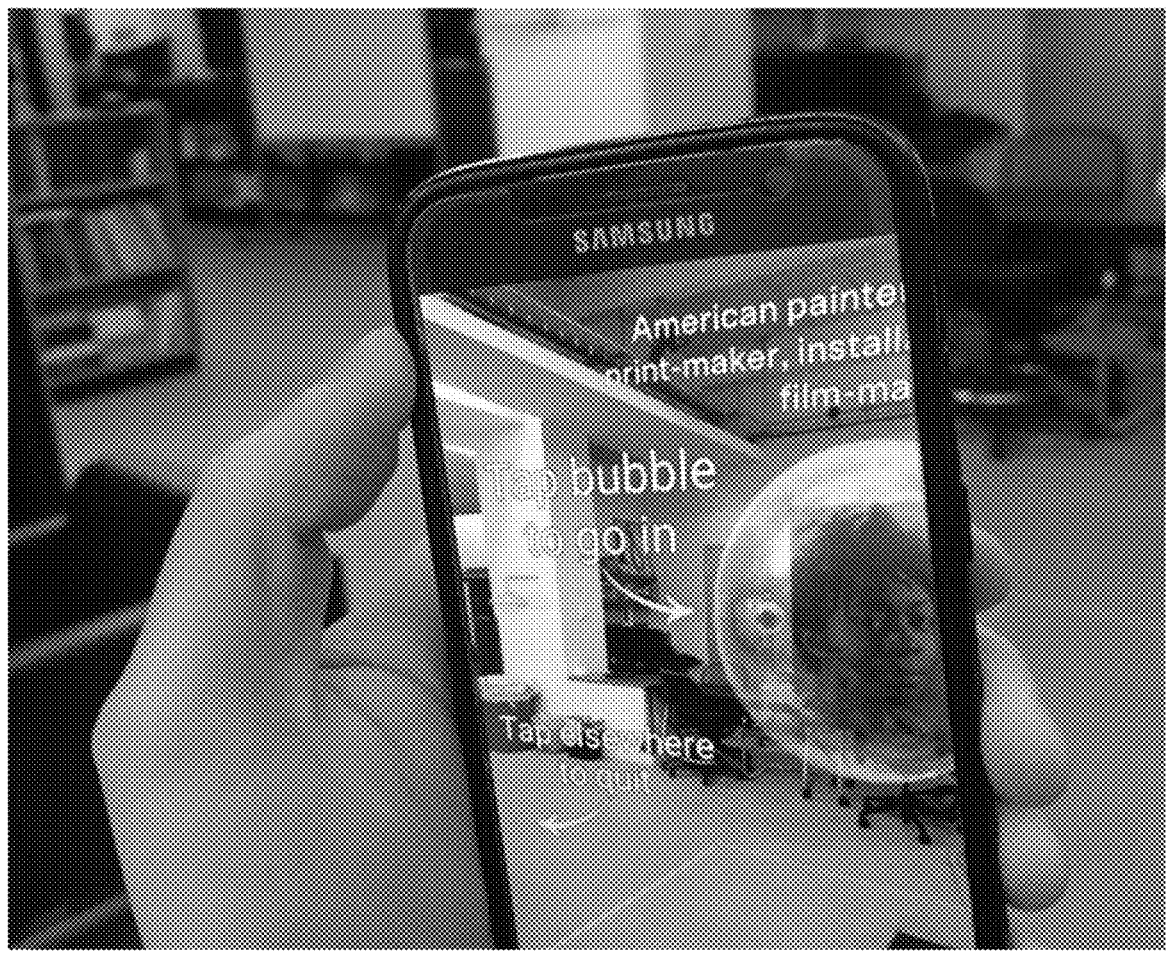

In step 650, as shown in FIG. 7D, a foam (e.g., representing a hierarchy of bubbles) associated with BCP 102 may emerge from the portal. During the emergence of the foam, various bubbles may circle or surround the user and then XR application 206 or a related interface may make various interaction options available to the user.

In some embodiments, each bubble in a foam hierarchy may have an image and a description, allowing content to be broken up into an engaging and interactive structure. In such embodiments, when a user taps a bubble or walks into it, the foam may be scaled up so that the user is placed inside that bubble (e.g., a selected bubble grows so that its child bubbles surround the user).

In some embodiments, using initialization process 600, XR application 206 or a related interface may detect a ground plane (e.g., the physical environment's floor) relatively quickly (e.g., within a second or two of a user pointing the camera of XRCD 120 down towards the floor). In some embodiments, in the unlikely event that the floor is not identified by the time initialization process 600, initialization process 600 may be repeated.

It will be appreciated that process 600 is for illustrative purposes and that different and/or additional actions may be used. It will also be appreciated that various actions described herein may occur in a different order or sequence.

Figure 8A:
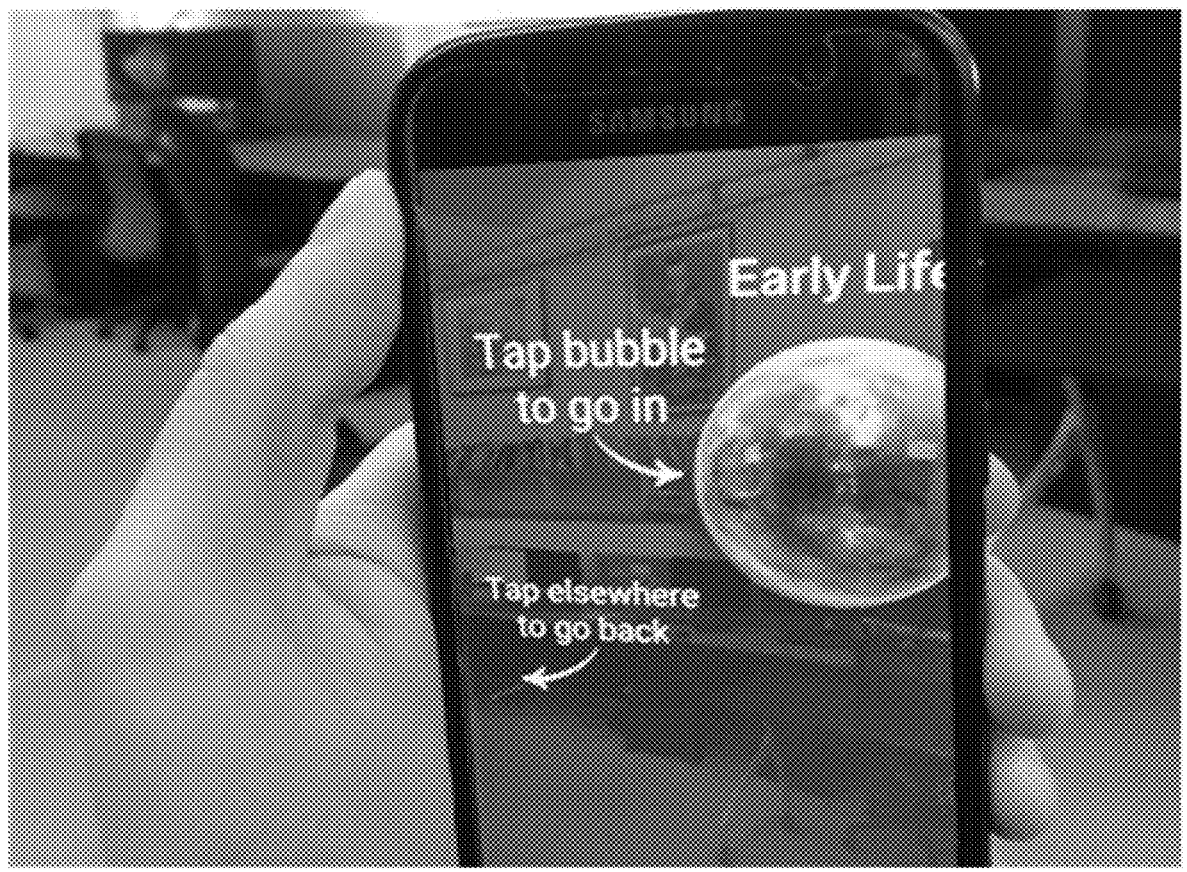
FIGS. 8A-8B depict screenshots indicating user interaction with an XR bubble interface or visual elements thereof.
Figure 8B:
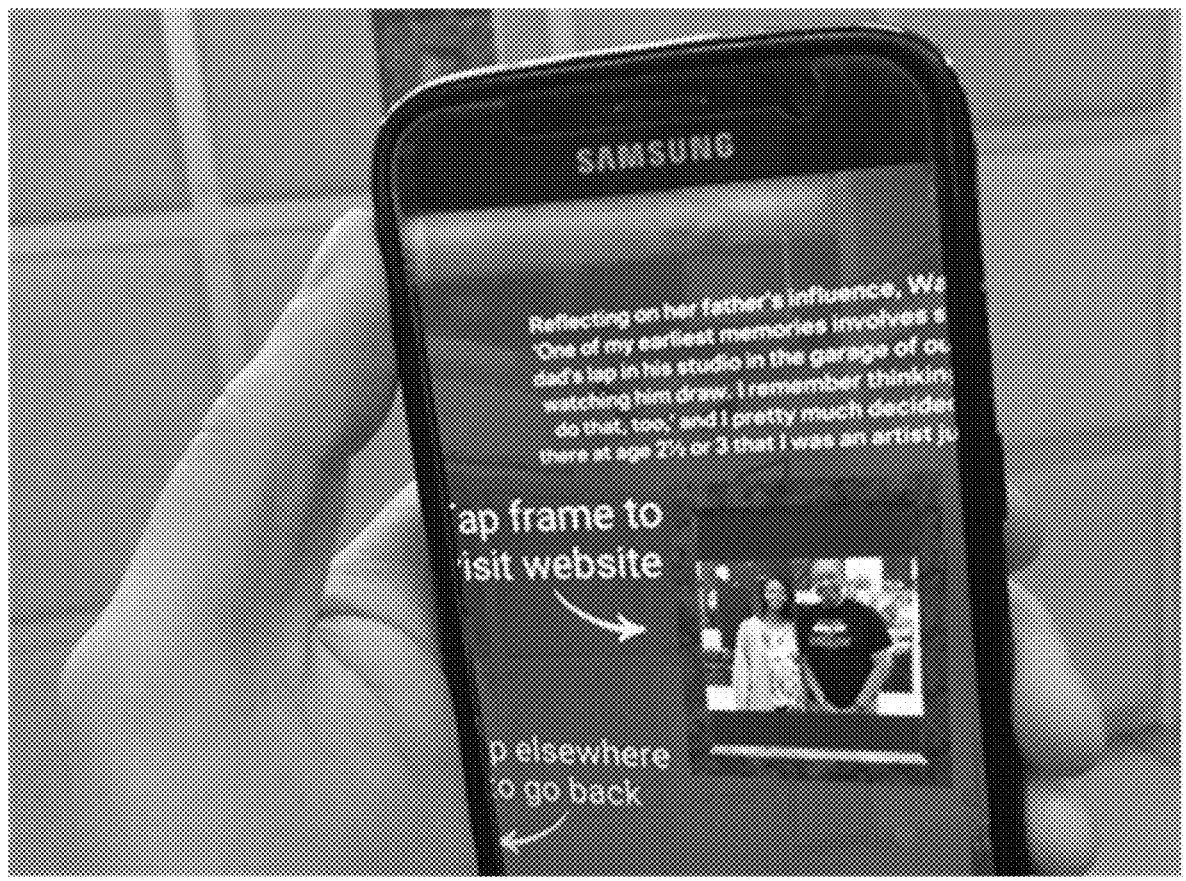

FIGS. 8A-8B depict screenshots indicating user interaction with an XR bubble interface or visual elements thereof. For example, after an environment has been scanned to determine horizontal and vertical surfaces, a fully constructed foam may emerge from a relevant portal (e.g., located on or near a poster or target image). In this example, when the foam is displayed, a main bubble (e.g., the root of the hierarchy) may be positioned at an appropriate height for a user to easily observe it (e.g., the height may be determined by taking into account the position of the XRCD camera with respect to the ground).

In some embodiments, e.g., when bubble interface application 124 implements or provides an XR bubble interface, a user may have various options for interacting with bubbles or other visual elements in a displayed foam. For example, when interacting with an XR bubble interface, a user may enter a non-leaf node of the bubble hierarchy, enter a leaf node bubble, exit a bubble, or return home.

In some embodiments, a user may enter a non-leaf node bubble by tapping on the position of the non-leaf node bubble on the display screen, by moving the position of their fingers, hands, or other part to the location of the bubble in the world, or by moving the position of a camera of XRCD 120 such that it appears that the user has entered the bubble. In such embodiments, this user interaction may result in the foam being scaled up, e.g., so as to make the bubble's children appear as an appropriate size for observation and/or interaction.

As shown in FIG. 8A, a user examines a child of the main bubble that has its own children, and so it can be entered just like the main bubble. In some embodiments, bubble interface application 124 or XR application 206 may support an arbitrary number of levels, and the associated tree does not need to be regular. In some embodiments, the entire bubble hierarchy may be constructed from a source BCP file In some embodiments, a user may enter a leaf node bubble by tapping on the position of the leaf node bubble on the display screen, by moving the position of their fingers, hands, or other part to the location of the bubble in the world, or by moving the position of a camera of XRCD 120 such that it appears that the user has entered the bubble. In such embodiments, this user interaction may result in the user accessing relevant content (e.g., images, a video, sounds, a 3D model, etc.) at an URL associated with the bubble (e.g., if there is a URL listed in the BCP file).

In some embodiments, leaf bubbles also can be visualized as a picture frame. For example, as shown in FIG. 8B, a user examines the child of a leaf node bubble. In this example, the child may be visualized as a picture frame, because it does not have any children. Continuing with this example, if the user taps the frame, they may be taken to a webpage associated with an URL stored within the corresponding node in the BCP file (if an URL link is specified).

In some embodiments, a user may exit a bubble by tapping on the wall of the bubble the user is currently in. In such embodiments, this user interaction may result in the foam being scaled down and the user exiting the current bubble and entering the previous bubble. In some embodiments, exiting a bubble as described above may be analogous to traversing a content hierarchy using a "back" button in a web browser or file explorer.

In some embodiments, a user may return home by tapping a special bubble positioned near the floor of bubble in the physical world. In such embodiments, this user interaction may result in the user exiting the foam. In some embodiments, returning home as described above may be analogous to a "home" button in a web browser of file explorer.

In some embodiments, a user may end or exit an XR user experience by tapping anywhere (e.g., on a display or screen associated with XRCD 120) that does not include the main bubble. In such embodiments, an exit option may only be available when the user is outside the main bubble (e.g., after tapping the home bubble described in option 4 above). In such embodiments, this user interaction may result in the foam being destroyed and the user returning to a target image-scanning stage (e.g., step 610 in FIG. 6).

It will be appreciated that FIGS. 8A-8B are for illustrative purposes and that different and/or additional actions than those depicted in FIGS. 8A-8B may be used. It will also be appreciated that various actions described herein may occur in a different order or sequence.

Figure 9:
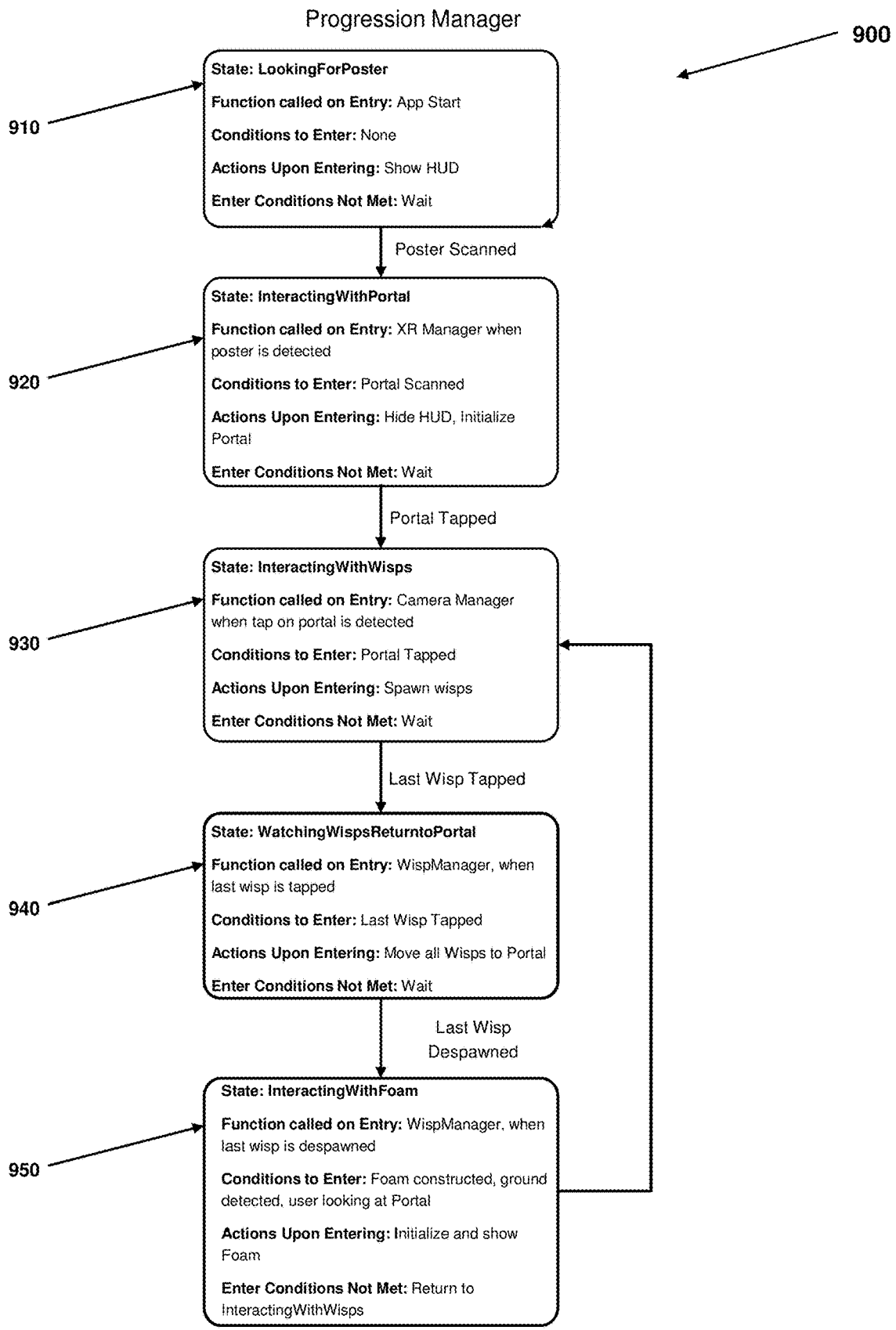
FIG. 9 is a flowchart illustrating a high-level execution model of an example progression manager.

FIG. 9 is a flowchart illustrating a high-level execution model of an example progression manager 900. For example, progression manager 900 or related logic may be implemented using software classes written in an object-oriented programming language (e.g., C++, C#, Java, etc.) usable for implementing or providing bubble interface application 124 or XR application 206.

As shown in FIG. 9, progression manager 900 may involve the example initialization process of FIG. 6. In step 910, a target image may be detected, e.g., during a "LookingForPoster" state associated with bubble interface application 124.

In step 920, after the poster is detected, the user may tap the location of a portal on the poster, e.g., during an "InteractingWithPortal" state associated with bubble interface application 124.

In step 930, various wisps for prompting a user to identify environmental features or scene boundaries (e.g., objects, walls, ceiling, and/or floor) may be shown, e.g., during an "InteractingWithWisps" state associated with bubble interface application 124.

In step 940, e.g., after the last wisp is tapped by the user, wisps may return to the portal, e.g., during an "WatchingWispsReturntoPortal" state associated with bubble interface application 124.

In step 950, e.g., after a ground or floor is detected, a foam (e.g., a hierarchy of bubbles) may be shown to user for interactions, e.g., during an "InteractingWithFoam" state associated with bubble interface application 124. Additional example details regarding a user interacting with a foam is discussed with regard to FIG. 10.

Figure 10:
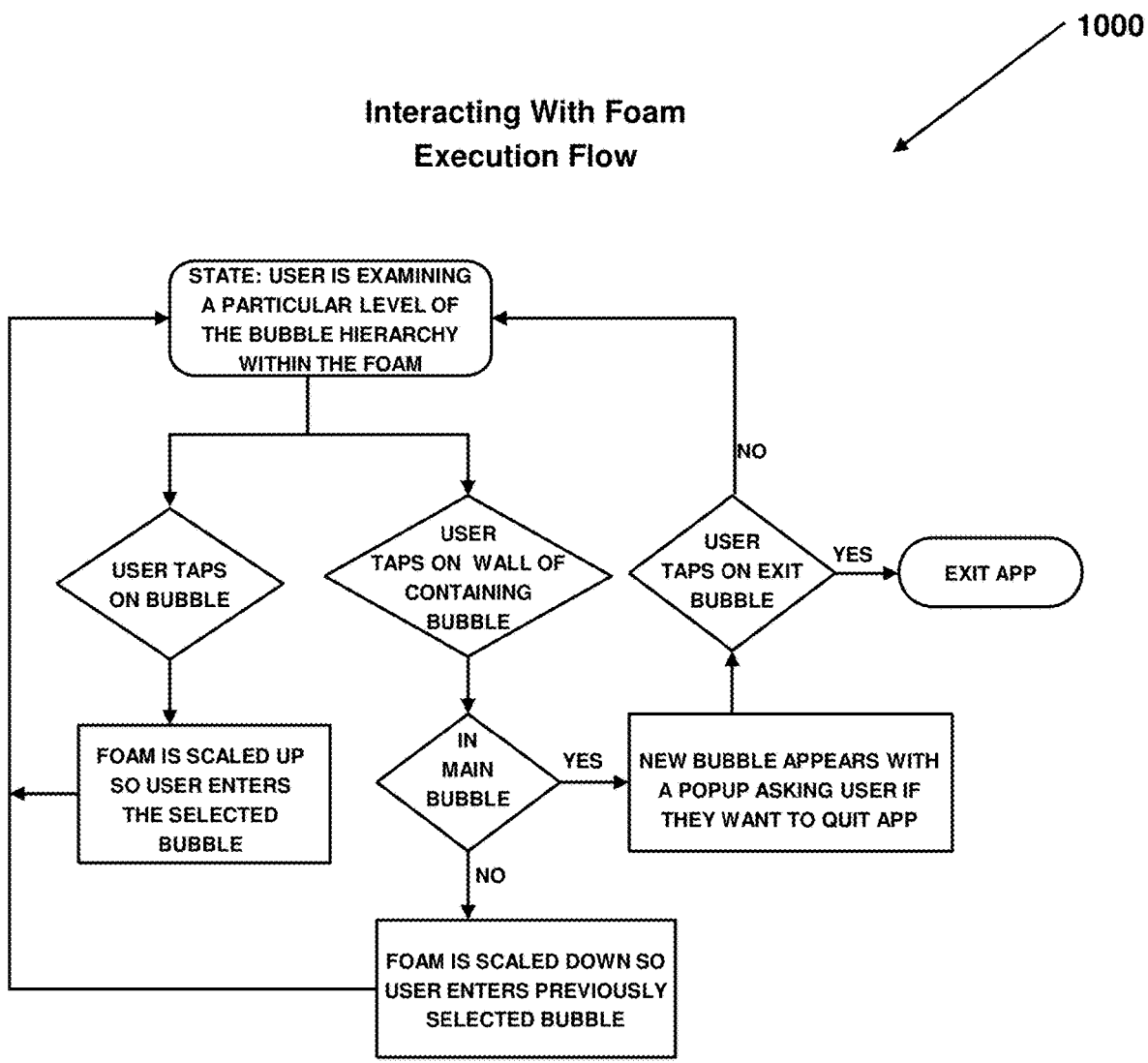
FIG. 10 is a flowchart illustrating example logic associated with user interactions involving XR interactive elements.

It will be appreciated that FIG. 10 is for illustrative purposes and that different and/or additional actions may be used. It will also be appreciated that various actions described herein may occur in a different order or sequence.

It will be appreciated that FIG. 9 is for illustrative purposes and that different and/or additional actions than those depicted in FIG. 9 may be used. It will also be appreciated that various actions described herein may occur in a different order or sequence.

FIG. 10 is a flowchart illustrating example logic 1000 associated with user interactions involving XR interactive elements. For example, logic 1000 may be implemented using software classes written in an object-oriented programming language (e.g., C++, C#, Java, etc.) usable for implementing or providing bubble interface application 124 or XR application 206.

Referring to FIG. 10, an example execution flow for interacting with foam (e.g., a hierarchy of bubbles) in an XR scene may start at an initial state where a user is examining a particular level of the bubble hierarchy within the foam. If a user tabs on an inner bubble (e.g., bubble within the containing bubble), the foam or related visual elements may be scaled up so that the user "enters" the selected bubble. If the user taps on the wall of the containing bubble, if the containing bubble is not a main bubble (e.g., a top-level bubble), the foam or related visual elements may be scaled down so that the user "enters" the previously selected bubble. If the user taps on the wall of the containing bubble, if the containing bubble is a main bubble (e.g., a top-level bubble), a popup bubble or visual element may appear asking the user if the want to quit the XR user experience or related application. If the user taps on the popup bubble or visual element, then the XR user experience or related application may exit.

It will be appreciated that FIG. 10 is for illustrative purposes and that different and/or additional actions than those depicted in FIG. 10 may be used. It will also be appreciated that various actions described herein may occur in a different order or sequence.

Figure 11:
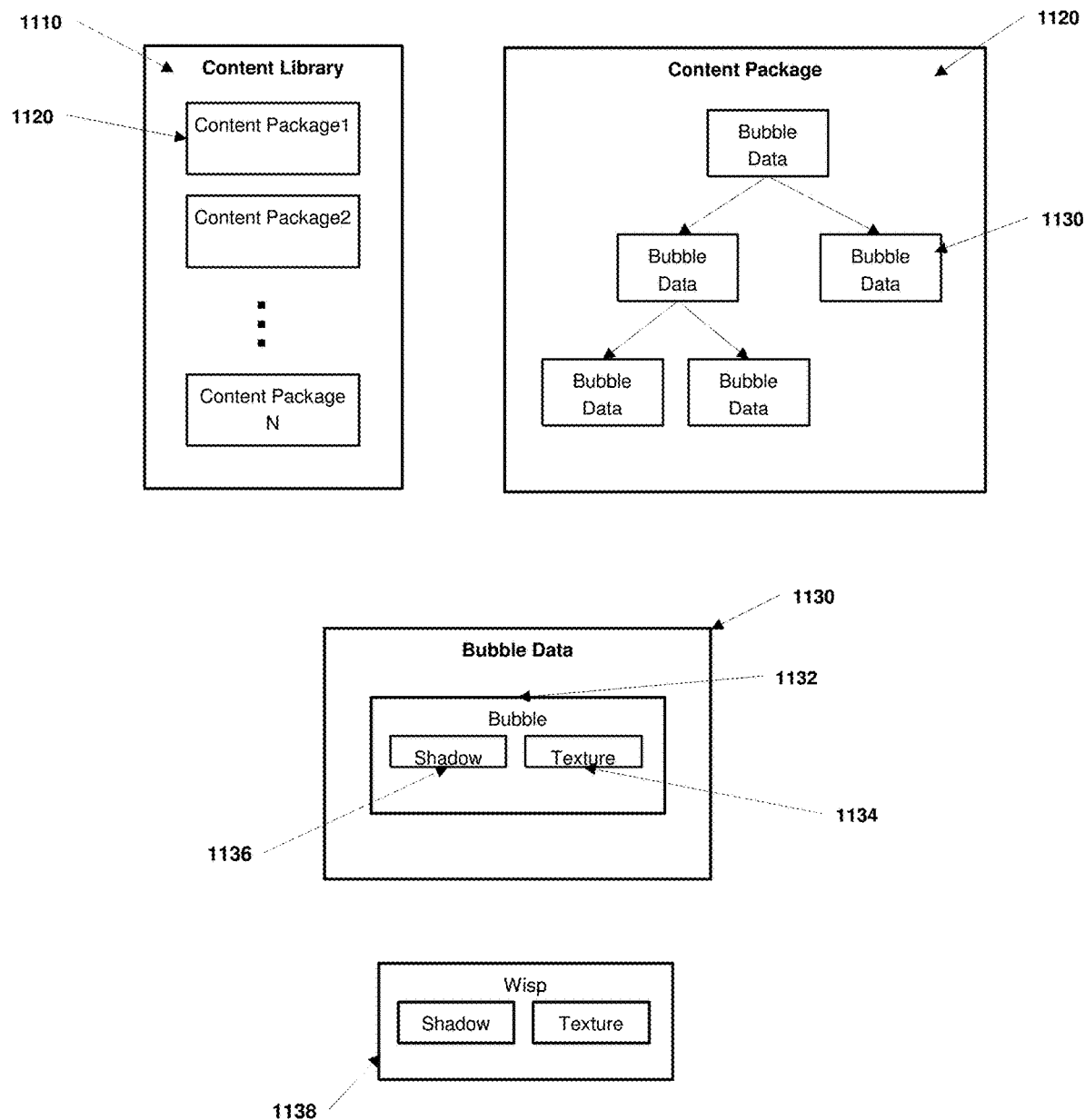
FIG. 11 is a diagram illustrating various classes or related objects associated with a bubble interface application.

FIG. 11 is a diagram illustrating various classes or related objects associated with a bubble interface application 124. Below are descriptions of various features and functionality of each class depicted in FIG. 11.

Bubble 1132 may represent a class for storing (e.g., containing or representing) and animating a unit of content along with child Bubbles. In some embodiments, Bubble 1132 or functions thereof that prompt an instance of a foam manager 1222 (see description below) to focus on particular bubbles in response to relevant user interaction.

Bubble data 1130 may represent a class for storing data for one bubble 932, e.g., a description, an image, URL links, etc. In some embodiments, bubble data 1130 may also store children elements for storing various data about children bubbles.

Content package 1120 may represent a class for storing a hierarchy of bubble data instances for an XR user experience (e.g., data for a particular topic or event).

Content Library 1110 may represent a class for storing a collection of content packages instances. In some embodiments, a content save load manager 1216 or functions thereof may be used for saving packages (e.g., BCP 102) locally, e.g., at XRCD 120.

Wisp 1138 may represent a class for visually prompting a user to look around an environment (e.g., at the ground). In some embodiments, a wisp instance may require a user to interact (e.g., by tapping) to proceed, e.g., to see bubbles or other interactive elements in an XR space.

Shadow 1136 may represent a class for animating a shadow that corresponds to a tracked game object. In some embodiments, repositions for a shadow may be based on the tracked game object, an environment floor, and an environmental light.

Texture 1134 may represent a class for storing or representing serializable texture data.

It will be appreciated that FIG. 11 is for illustrative purposes and that different and/or additional classes or related objects may be used. It will also be appreciated that various class features or functions described above with regard to a particular class or related object in FIG. 11 may be associated with one or more other classes and/or related objects.

Figure 12:
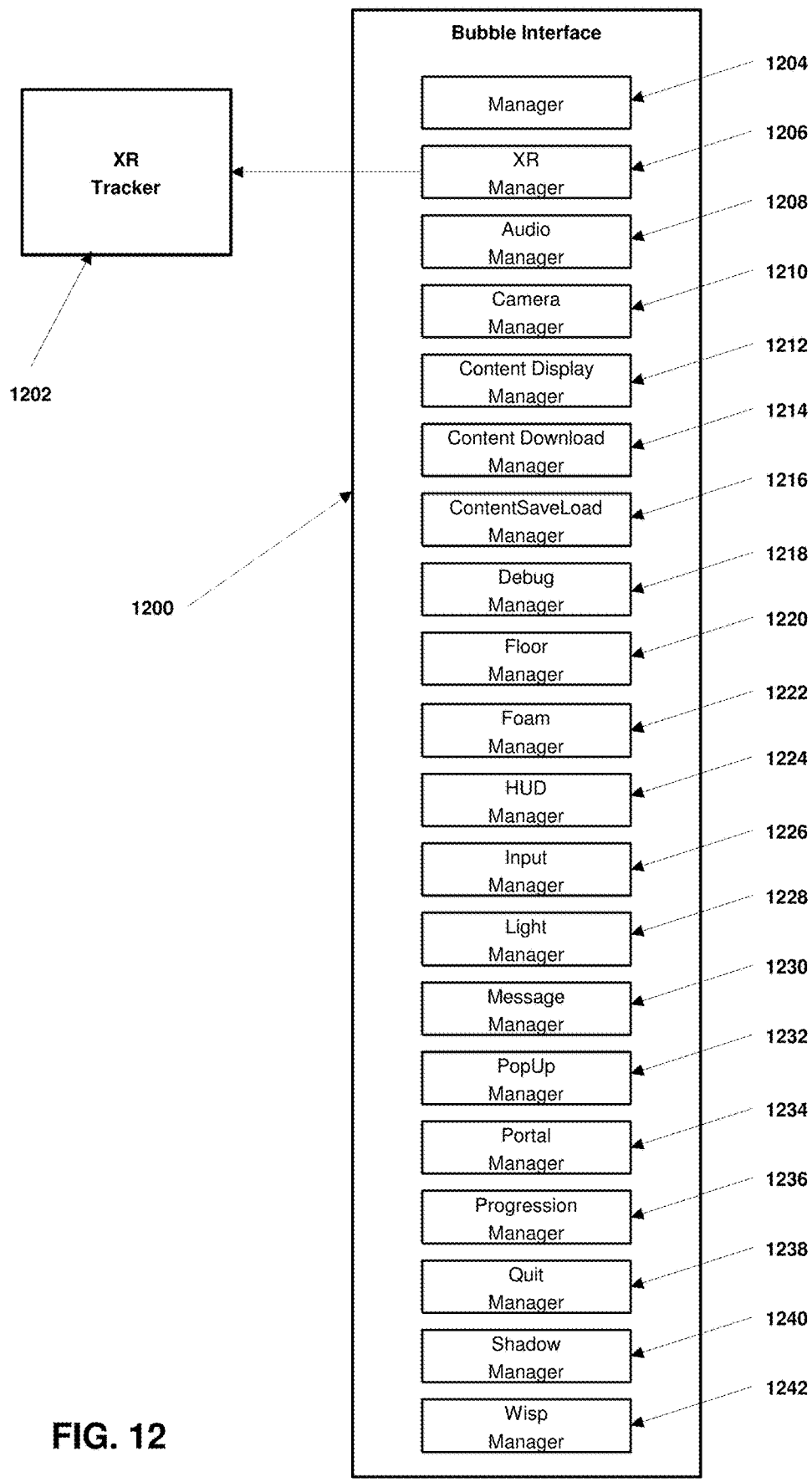
FIG. 12 is a diagram illustrating various classes or related objects associated with implementing or providing a bubble interface.

FIG. 12 is a diagram illustrating various classes or related objects associated with implementing or providing a bubble interface 1200. In some embodiments, various manager classes associated with bubble interface 1200 may be usable to organize functions and data into classes that allow them to interact with graphics/game engine container components called "game objects" that contain assets (e.g., 3D models, images, animations, sounds, etc.) and executable code called "scripts". Below are descriptions of various features and functionality of classes depicted in FIG. 12.

Manager 1204 may represent an abstract base class from which other manager classes can be derived.

XR manager 1206 may represent a class for detecting XR trackables (e.g., posters, vertical planes, horizontal planes, etc.) and for updating XR Trackers (e.g., instances of XR Tracker 1202) for relevant video frame(s) (e.g., re-anchoring them if needed).

Audio manager 1208 may represent a class for aggregating and/or playing sound effects.

Camera manager 1210 may represent a class for determines what a user is looking at and acting accordingly. For example, camera manager 1210 may handle user interactions (e.g., when the user tap on the screen).

Content display manager 1212 may represent a class for orchestrating various functions associated content save load manager 1216 and content download manager 1214. Content display manager 1212 may also facilitates construction of an instance of foam manager 1222 once content is available.

Content download manager 1214 may represent a class for downloading data that populates bubbles (or other interactive elements) in an instance of foam manager 1222. Content download manager 1214 may be programmed to defer to content save load manager 1214 for content loading if a content package (e.g., BCP 102) is saved locally (e.g., at XRCD 120).

Content save load manager 1216 may represent a class for saving content package data (e.g., BCP 102) to a local content library (e.g., on or at XRCD 120). Content save load manager 1216 may also include functions for loading content package data from the local content library if available.

Debug manager 1218 may represent a class for printing debug messages to a console or screen, e.g., based on a build context.

Floor manager 1220 may represent a class for storing a detected plane (e.g., during initialization process of FIG. 6) as an XR scene's floor.

Foam manager 1222 may represent a class for constructing and manipulating a displayed hierarchy of bubbles for representing various content. For example, foam manager 1222 may orchestrate bubble fading, spinning, shadowing, or foam related visual effects.

Head-up display (HUD) manager 1224 may represent a class for showing and hiding a HUD (e.g., a screen-space user interface).

Input manager 1226 may represent a class for converting user input based on a build context (e.g., mouse vs. touchscreen).

Light manager 1228 may represent a class for storing an XR scene's directional light.

Message manager 1230 may represent a class for displaying XR related messages on XRCD 120, platform 200, or a related output device or display.

Popup manager 1232 may represent a class for animating tooltip-style messages that appear in an XR scene or related world space.

Portal manager 1234 may represent a class for storing and/or manipulating a portal that overlays an XR poster. For example, a portal may trigger an XR user experience based on a URI or other identifier on a target image, such as an XR poster.

Progression manager 1236 may represent a class for moving or changing an XR user experience between various stages. For example, progression manager 1236 may handle each stage's conditions (to enter) and related actions (upon entering).

Quit manager 1238 may represent a class for quitting bubble interface application 124 or XR application 206.

Shadow manager 1240 may represent a class for acting as a transform parent for shadows (e.g., of bubbles, of wisps).

Wisp manager 1242 may represent a class for storing and/or manages wisps.

In some embodiments, XR Manager class 1206 or functions thereof may call functions in XR Tracker class 1202 which can interface with XR subsystem 128.

In some embodiments, functions in XR Tracker class 1202 may enable an instance of XR Manager class 1206 to attach application Bubble game objects to trackable objects (e.g., images, horizontal and vertical planes, spatial anchors, 3D objects, etc.) implemented in XR subsystem 128.

It will be appreciated that FIG. 12 is for illustrative purposes and that different and/or additional classes or related objects may be used. It will also be appreciated that various class features or functions described above with regard to a particular class or related object in FIG. 12 may be associated with one or more other classes and/or related objects.

Although specific examples and features have been described above, these examples and features are not intended to limit the scope of the present disclosure, even where only a single example is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the claims, features from dependent claims may be combined with those of the independent claims and features from respective independent claims may be combined in any appropriate manner and not merely in the specific combinations enumerated in the claims.

What is claimed is:

1. A method for providing an extended reality (XR) user interface, the method comprising:
    at a user device executing an extended reality (XR) application;
    receiving content information about a hierarchical container structure comprising one or more elements at each level of the hierarchical container structure, wherein each of the one or more elements at each level of the hierarchical container structure represents a container, a sub-container, or a data element of the hierarchical container structure;
    obtaining, via the XR application, spatial information about a physical and/or virtual environment;
    generating, using the content information, a first immersive visual element in the physical and/or virtual environment, wherein the first immersive visual element is for visually representing the hierarchical container structure; and
    in response to the user interacting with the first immersive visual element, causing, using the XR application, the spatial information, and a display, the first immersive visual element to appear to encapsulate the user with a surrounding visible representation by augmenting a view of the physical and/or virtual environment, wherein the XR application is configured to allow a user to interact with a second immersive visual element of a first set of elements representing a first level of the hierarchical container structure, wherein in response to the user interacting with the second immersive visual element the second immersive visual element appears to encapsulate the user to provide access to a second set of elements representing a second level of the hierarchical container structure.

2. The method of claim 1 wherein the content information is provided in a human readable file format, an extensible markup language (XML) format, a data interchange format, or a JavaScript object notation (JSON) format.

3. The method of claim 1 wherein the content information is provided in response to detecting or scanning an image or an object, by utilizing a uniform resource identifier (URI), or by clicking or selecting a hyperlink or interactive object via a user interface.

4. The method of claim 1 wherein the spatial information includes a location of a ground plane in the physical and/or virtual environment, a location of a vertical surface in the physical and/or virtual environment, or a location of a horizontal surface in the physical and/or virtual environment.

5. The method of claim 1 wherein the first immersive visual element is represented as a semi-translucent shape element; and
wherein the semi-translucent shape element includes one or more additional immersive visual elements representing files, images, videos and/or sub-containers; or
wherein the semi-translucent shape element is represented as a sphere-like bubble.

6. The method of claim 1 wherein generating the first immersive visual element includes allowing the user to interact with the first immersive visual element by selecting or tapping the first immersive visual element, by selecting or tapping outside the first immersive visual element, by selecting or tapping a contained element within the first immersive visual element, by moving into or toward a physical location in the physical and/or virtual environment representing the first immersive visual element, or by moving away from the physical location in the physical and/or virtual environment representing the first immersive visual element.

7. The method of claim 1 wherein generating the first immersive visual element includes providing one or more visual cues for enhancing user experience or user interaction, wherein the one or more visual cues includes providing a shadow for the first immersive visual element, providing shading for the first immersive visual element, providing descriptive text or user prompts associated with the first immersive visual element, or providing a visual transition for indicating a user interaction event or for different actions associated with the first immersive visual element.

8. The method of claim 1 wherein generating the first immersive visual element includes providing an interface for allowing the user to change or add information, immersive visual elements, or preferences to the first immersive visual element or a related data file, wherein changes are stored and accessible by one or more users.

9. The method of claim 1 wherein the content information is stored and indexed using a unique identifier for subsequent usage by the user device.

10. A system for providing an extended reality (XR) user interface, the system comprising:
one or more processors; and
a user device executing an extended reality (XR) application using the one or more processors, wherein the user device is configured to perform operations comprising:
receiving content information about a hierarchical container structure comprising one or more elements at each level of the hierarchical container structure, wherein each of the one or more elements at each level of the hierarchical container structure represents a container, a sub-container, or a data element of the hierarchical container structure;
obtaining, via the XR application, spatial information about a physical and/or virtual environment;
generating, using the content information, a first immersive visual element in the physical and/or virtual environment, wherein the first immersive visual element is for visually representing the hierarchical container structure; and
in response to the user interacting with the first immersive visual element, causing, using the XR application, the spatial information, and a display, the first immersive visual element to appear to encapsulate the user with a surrounding visible representation by augmenting a view of the physical and/or virtual environment, wherein the XR application is configured to allow a user to interact with a second immersive visual element of a first set of elements representing a first level of the hierarchical container structure, wherein in response to the user interacting with the second immersive visual element the second immersive visual element appears to encapsulate the user to provide access to a second set of elements representing a second level of the hierarchical container structure.

11. The system of claim 10 wherein the content information is provided in a human readable file format, an extensible markup language (XML) format, a data interchange format, or a JavaScript object notation (JSON) format.

12. The system of claim 10 wherein the content information is provided in response to detecting or scanning an image or an object, by utilizing a uniform resource identifier (URI), or by clicking or selecting a hyperlink or interactive object via a user interface.

13. The system of claim 10 wherein the spatial information includes a location of a ground plane in the physical and/or virtual environment, a location of a vertical surface in the physical and/or virtual environment, or a location of a horizontal surface in the physical and/or virtual environment.

14. The system of claim 10 wherein the first immersive visual element is represented as a semi-translucent shape element; and
wherein the semi-translucent shape element includes one or more additional immersive visual elements representing files, images, videos and/or sub-containers; or
wherein the semi-translucent shape element is represented as a sphere-like bubble.

15. The system of claim 10 wherein the XR application is configured for allowing the user to interact with the first immersive visual element by selecting or tapping the first immersive visual element, by selecting or tapping outside the first immersive visual element, by selecting or tapping a contained element within the first immersive visual element, by moving into or toward a physical location in the physical and/or virtual environment representing the first immersive visual element, or by moving away from the physical location in the physical and/or virtual environment representing the first immersive visual element.

16. The system of claim 10 wherein generating the first immersive visual element includes providing one or more visual cues for enhancing user experience or user interaction, wherein the one or more visual cues includes providing a shadow for the first immersive visual element, providing shading for the first immersive visual element, providing descriptive text or user prompts associated with the first immersive visual element, or providing a visual transition for indicating a user interaction event or for different actions associated with the first immersive visual element.

17. The system of claim 10 wherein generating the first immersive visual element includes providing an interface for allowing the user to change or add information, immersive visual elements, or preferences to the first immersive visual element or a related data file, wherein changes are stored and accessible by one or more users.

18. The system of claim 10 wherein the content information is stored and indexed using a unique identifier for subsequent usage by the user device.

19. A non-transitory computer readable medium storing executable instructions that when executed by at least one processor of a computer cause the computer to perform operations comprising:

at a user device executing an extended reality (XR) application:

receiving content information about a hierarchical container structure comprising one or more elements at each level of the hierarchical container structure, wherein each of the one or more elements at each level of the hierarchical container structure represents a container, a sub-container, or a data element of the hierarchical container structure;

obtaining, via the XR application, spatial information about a physical and/or virtual environment;

generating, using the content information, a first immersive visual element in the physical and/or virtual environment, wherein the first immersive visual element is for visually representing the hierarchical container structure; and in response to the user interacting with the first immersive visual element, causing, using the XR application, the spatial information, and a display, the first immersive visual element to appear to encapsulate the user with a surrounding visible representation by augmenting a view of the physical and/or virtual environment, wherein the XR application is configured to allow a user to interact with a second immersive visual element of a first set of elements representing a first level of the hierarchical container structure, wherein in response to the user interacting with the second immersive visual element the second immersive visual element appears to encapsulate the user to provide access to a second set of elements representing a second level of the hierarchical container structure.

20. The non-transitory computer readable medium of claim 19 wherein the content information is provided in a human readable file format, an extensible markup language (XML) format, a data interchange format, or a JavaScript object notation (JSON) format.

* * * * *